June 29, 1965 A. M. DAVOCK ETAL 3,191,317

TANK TURRET TRAINER

Filed Dec. 15, 1961 25 Sheets-Sheet 1

INVENTORS
ALFRED M. DAVOCK
DANA C. MANNING
BY
Laurence S. Epstein
ATTORNEY

INVENTORS
ALFRED M. DAVOCK
DANA C. MANNING
BY
Laurence S. Epstein
ATTORNEY

TANK TURRET TRAINER

Filed Dec. 15, 1961 25 Sheets-Sheet 3

INVENTORS
ALFRED M. DAVOCK
DANA C. MANNING
BY
Laurence S. Epstein
ATTORNEY

INVENTORS
ALFRED M. DAVOCK
DANA C. MANNING
BY
Laurence S. Epstein
ATTORNEY

TANK TURRET TRAINER

Filed Dec. 15, 1961 25 Sheets-Sheet 5

INVENTORS
ALFRED M. DAVOCK
DANA C. MANNING
BY
Laurence S. Epstein
ATTORNEY

June 29, 1965 A. M. DAVOCK ETAL 3,191,317

TANK TURRET TRAINER

Filed Dec. 15, 1961 25 Sheets-Sheet 6

INVENTORS
ALFRED M. DAVOCK
DANA C. MANNING

BY Laurence S. Epstein
ATTORNEY

June 29, 1965 A. M. DAVOCK ETAL 3,191,317

TANK TURRET TRAINER

Filed Dec. 15, 1961 25 Sheets-Sheet 7

INVENTORS
ALFRED M. DAVOCK
DANA C. MANNING
BY
Laurence S. Epstein
ATTORNEY

INVENTORS
ALFRED M. DAVOCK
DANA C. MANNING
BY
Laurence S. Epstein
ATTORNEY

INVENTORS
ALFRED M. DAVOCK
DANA C. MANNING
BY
Laurence S. Epstein
ATTORNEY

INVENTORS
ALFRED M. DAVOCK
DANA C. MANNING
BY
Laurence S. Epstein
ATTORNEY

TANK TURRET TRAINER

Filed Dec. 15, 1961 25 Sheets-Sheet 11

INVENTORS
ALFRED M. DAVOCK
DANA C. MANNING
BY
Laurence S. Epstein
ATTORNEY

June 29, 1965 A. M. DAVOCK ETAL 3,191,317

TANK TURRET TRAINER

Filed Dec. 15, 1961 25 Sheets-Sheet 12

INVENTORS
ALFRED M. DAVOCK
DANA C. MANNING
BY
Laurence S. Epstein
ATTORNEY

INVENTORS
ALFRED M. DAVOCK
DANA C. MANNING
BY
Laurence S. Epstein
ATTORNEY

TANK TURRET TRAINER

Filed Dec. 15, 1961

INVENTORS
ALFRED M. DAVOCK
DANA C. MANNING
BY
Laurence S. Epstein
ATTORNEY

INVENTORS
ALFRED M. DAVOCK
DANA C. MANNING
BY
Laurence S. Epstein
ATTORNEY

INVENTORS
ALFRED M. DAVOCK
DANA C. MANNING
BY Lawrence S. Epstein
ATTORNEY

INVENTORS
ALFRED M. DAVOCK
DANA C. MANNING
BY
Laurence S. Epstein
ATTORNEY

INVENTORS
ALFRED M. DAVOCK
DANA C. MANNING
BY
Laurence S. Epstein
ATTORNEY

INVENTORS
ALFRED M. DAVOCK
DANA C. MANNING
BY
Laurence S. Epstein
ATTORNEY

INVENTORS
ALFRED M. DAVOCK
DANA C. MANNING
BY
Laurence S. Epstein
ATTORNEY

June 29, 1965 A. M. DAVOCK ETAL 3,191,317

TANK TURRET TRAINER

Filed Dec. 15, 1961 25 Sheets-Sheet 21

INVENTORS
ALFRED M. DAVOCK
DANA C. MANNING
BY
Laurence S. Epstein
ATTORNEY

INVENTORS
ALFRED M. DAVOCK
DANA C. MANNING
BY
Laurence S. Epstein
ATTORNEY

June 29, 1965 A. M. DAVOCK ETAL 3,191,317

TANK TURRET TRAINER

Filed Dec. 15, 1961 25 Sheets-Sheet 23

INVENTORS
ALFRED M. DAVOCK
DANA C. MANNING
BY
Laurence S. Epstein
ATTORNEY

INVENTORS
ALFRED M. DAVOCK
DANA C. MANNING
BY
Laurence S. Epstein
ATTORNEY

INVENTORS
ALFRED M. DAVOCK
DANA C. MANNING
BY
Laurence S. Epstein
ATTORNEY

United States Patent Office 3,191,317
Patented June 29, 1965

3,191,317
TANK TURRET TRAINER

Alfred M. Davock, Birmingham, and Dana C. Manning, Detroit, Mich., assignors, by mesne assignments, to the United States of America as represented by the Secretary of the Navy Filed Dec. 15, 1961, Ser. No. 159,801
3 Claims. (Cl. 35—25)

This invention relates to training apparatus and is particularly directed towards a rangefinder simulator wherein a static display containing a target is projected onto a screen at an undisclosed range and the distance from the subject to the target is varied in accordance with range data.

It is an object of the instant invention to provide a novel structure for training trainees in the use of stereo rangefinders.

A further object of the instant invention is to provide a novel structure for changing the apparent distance of target with respect to rangefinder.

Another object of the instant invention is to provide a novel training device which simulates changes in rangefinder to target distance utilizing a fixed rangefinder target distance.

Figure 1:
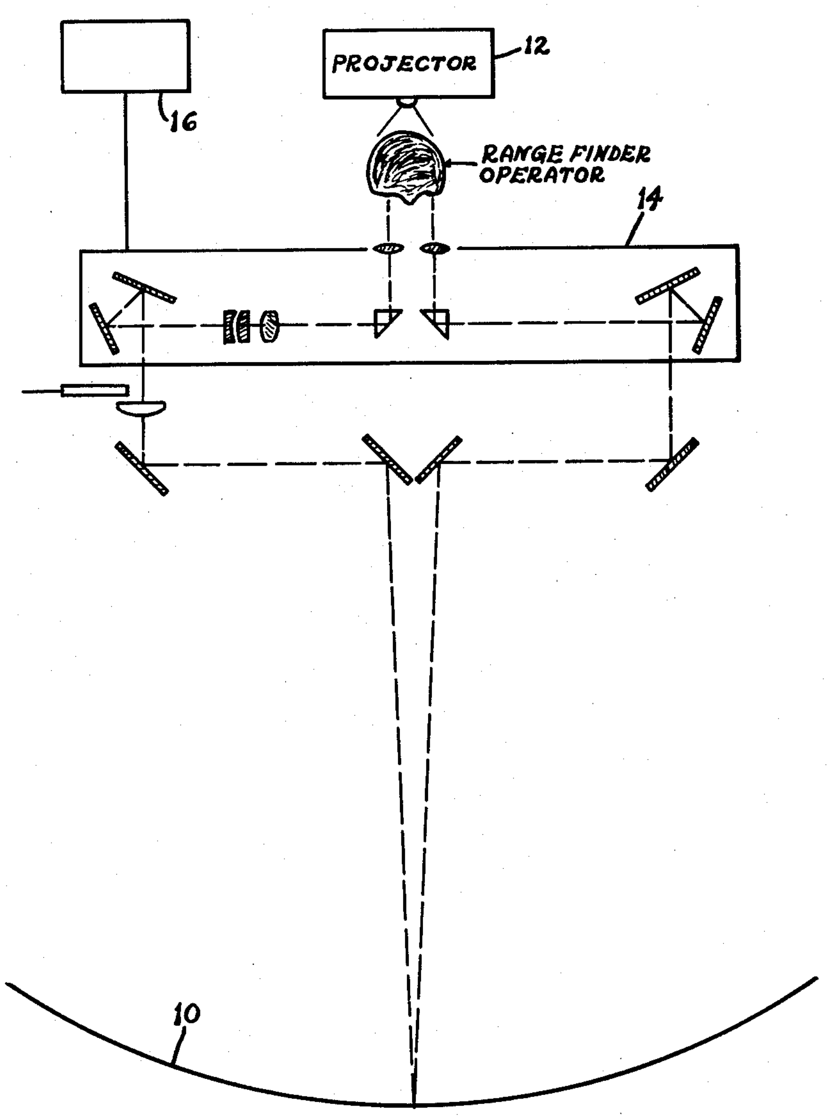
Figure 3:
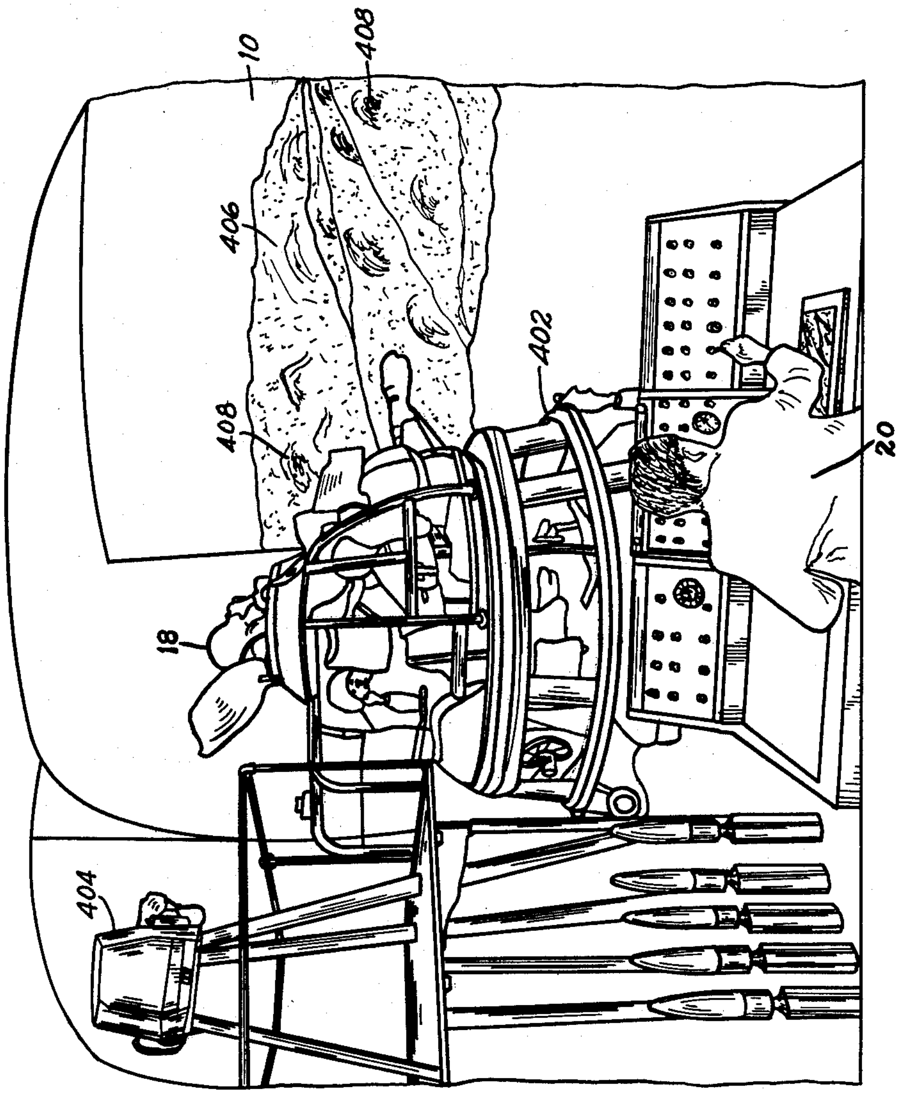
Figure 4A:
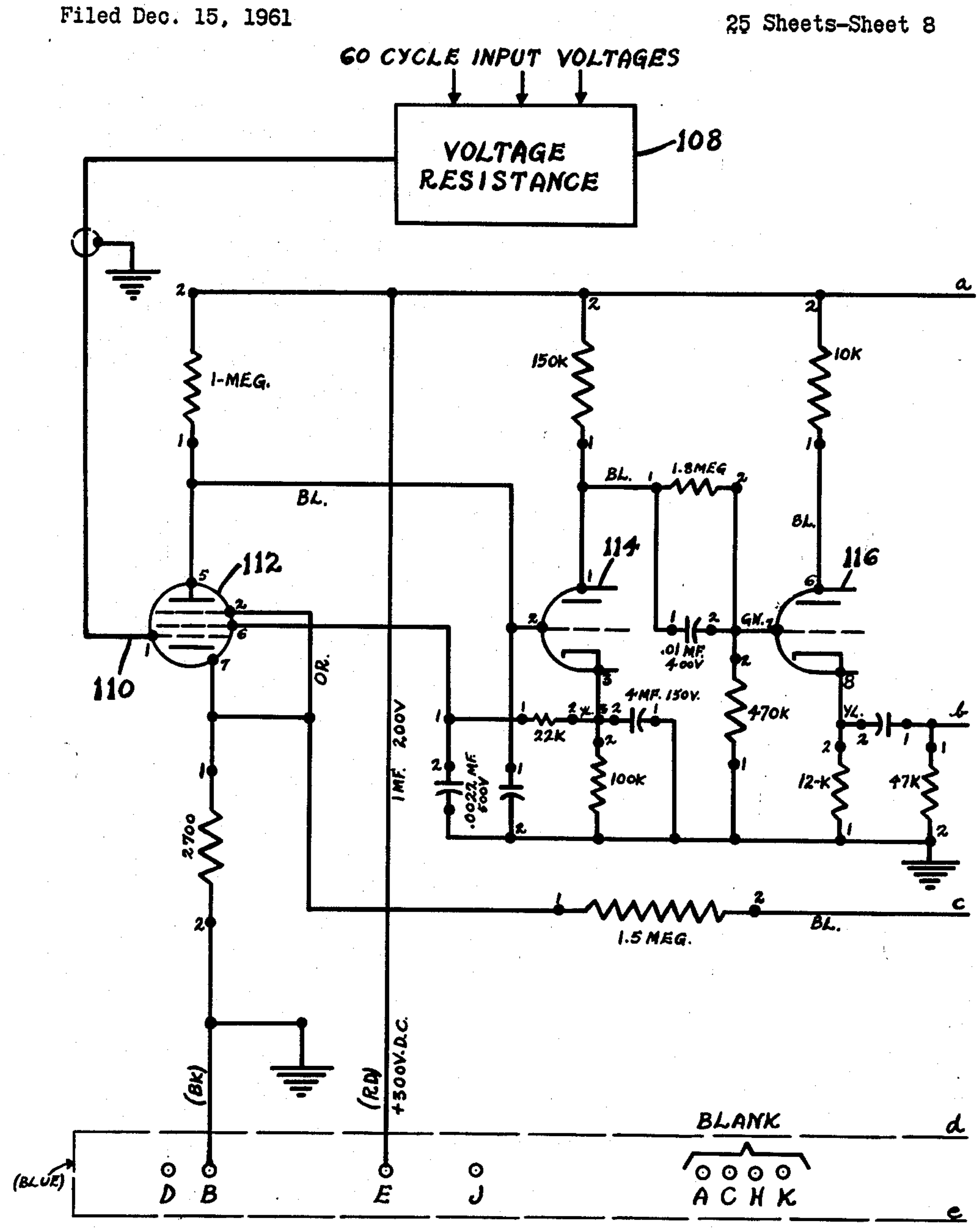
Figure 4B:
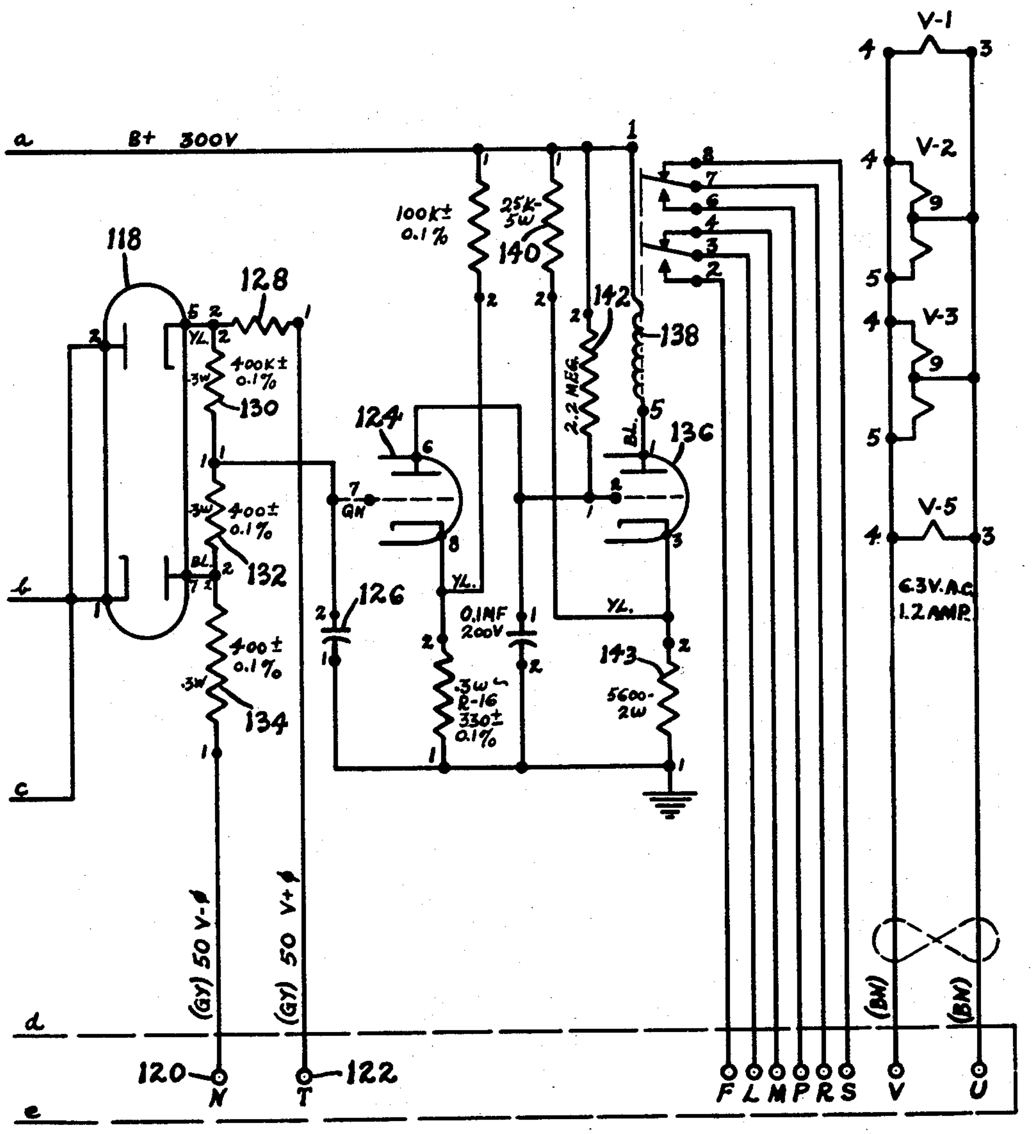
Figure 5A:
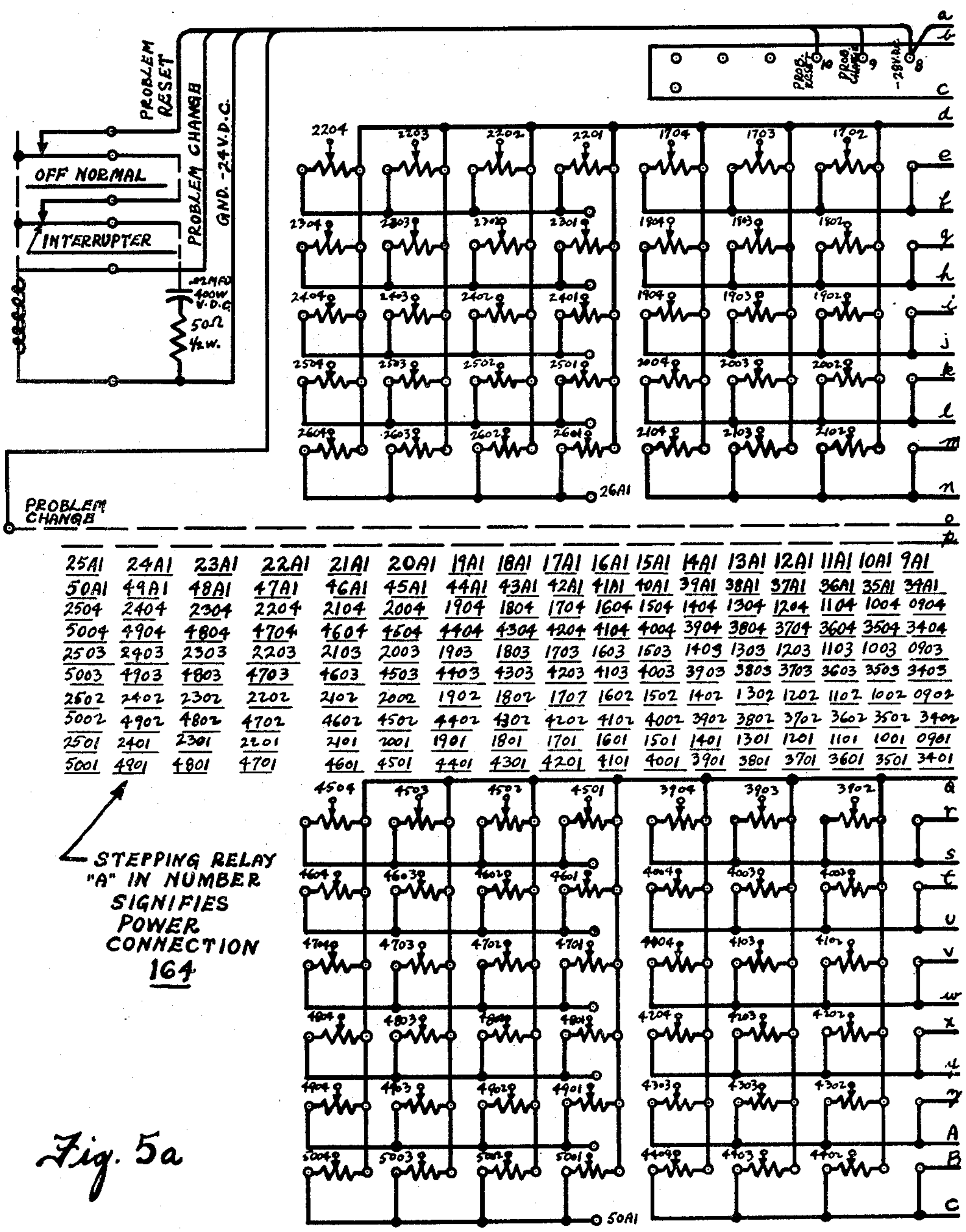
Figure 5B:
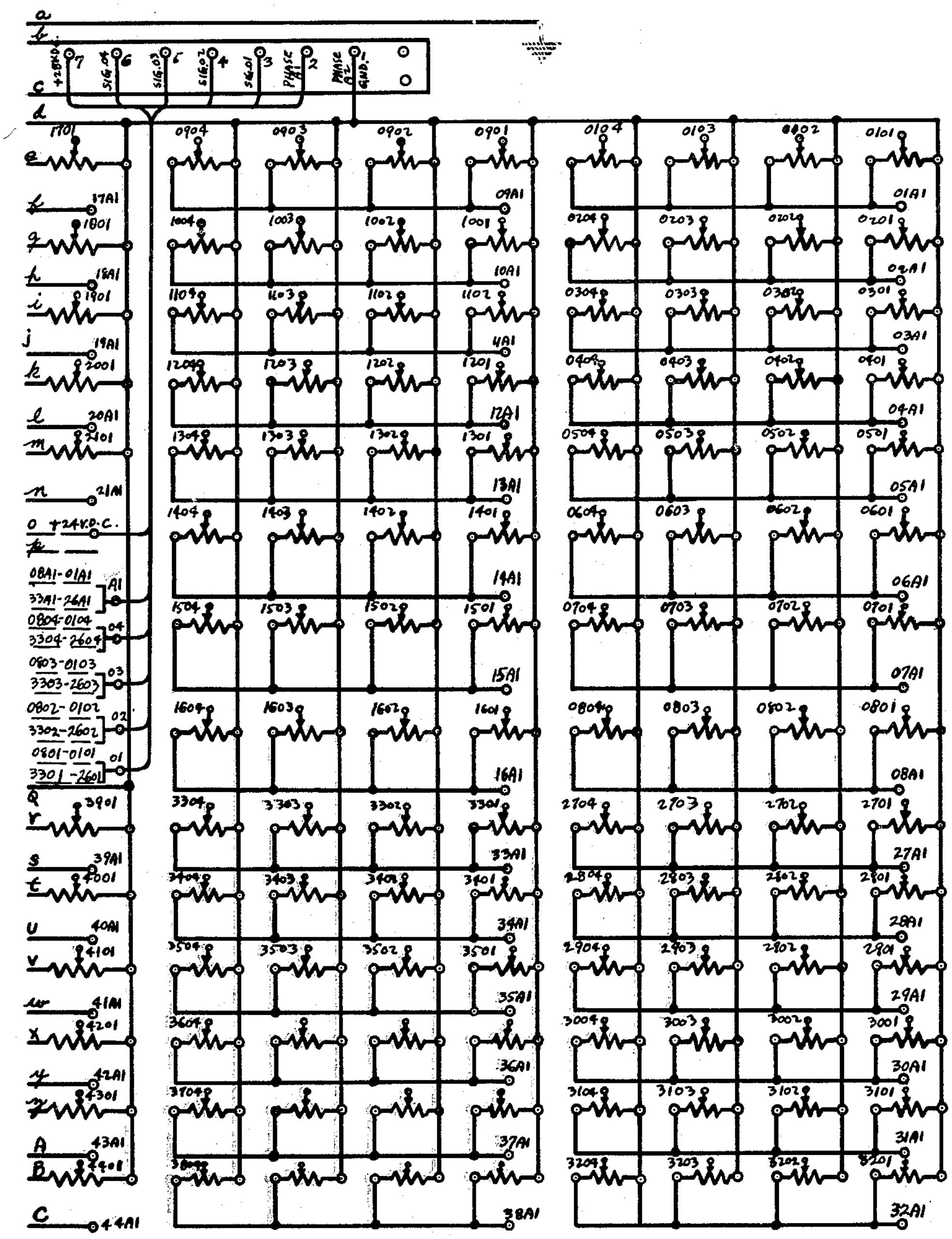
Figure 6A:
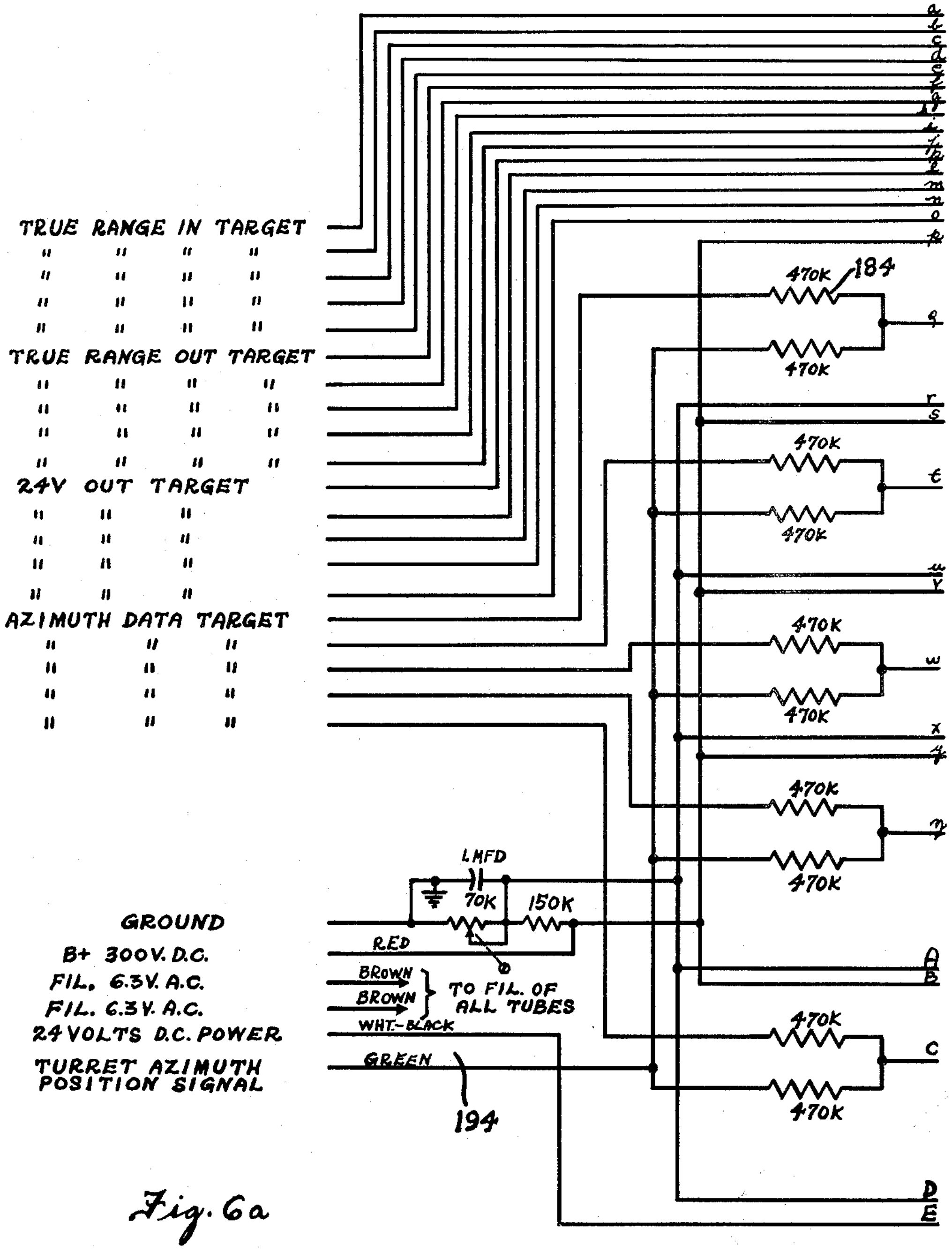
Figure 6B:
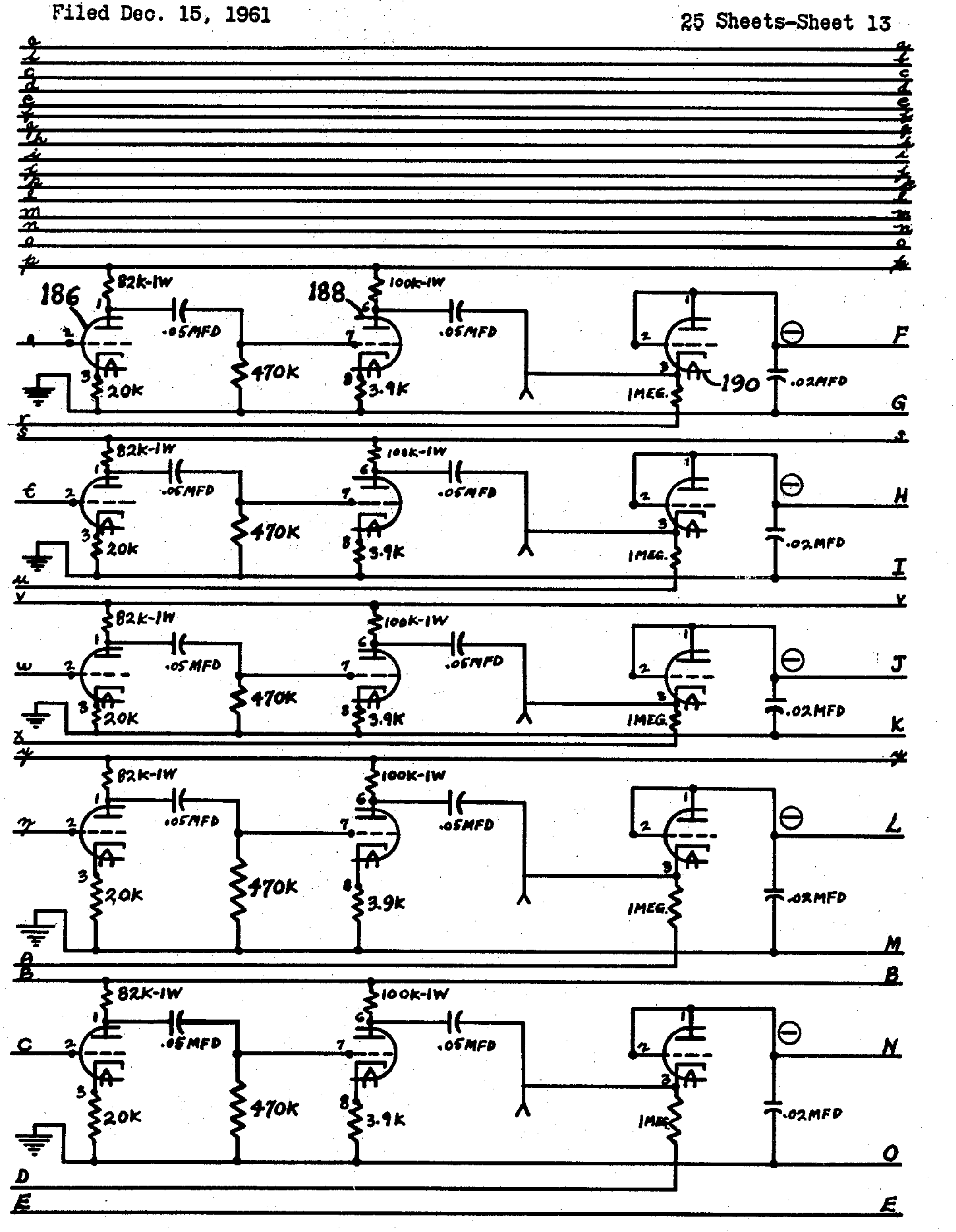
Figure 6C:
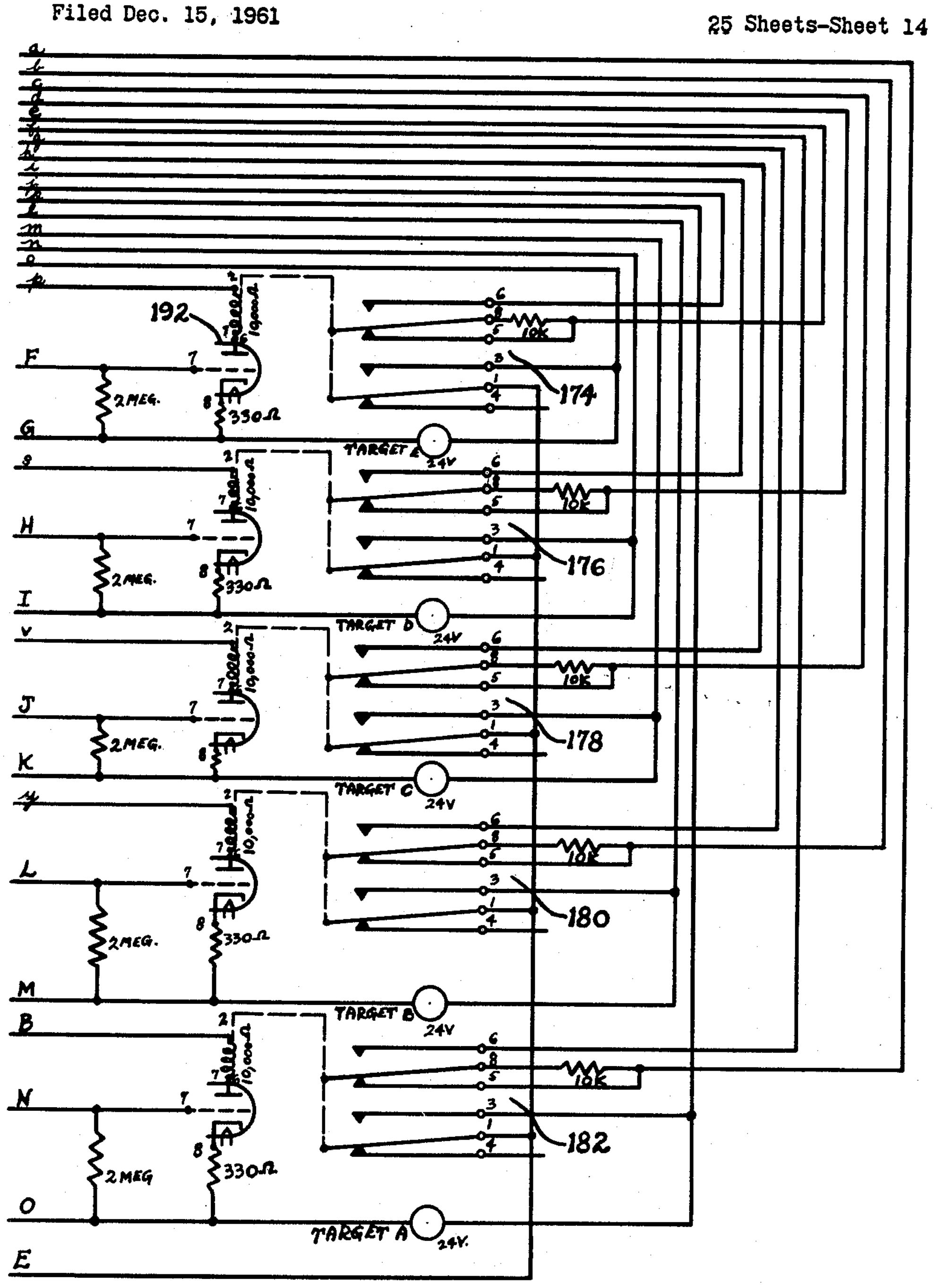
Figure 7A:
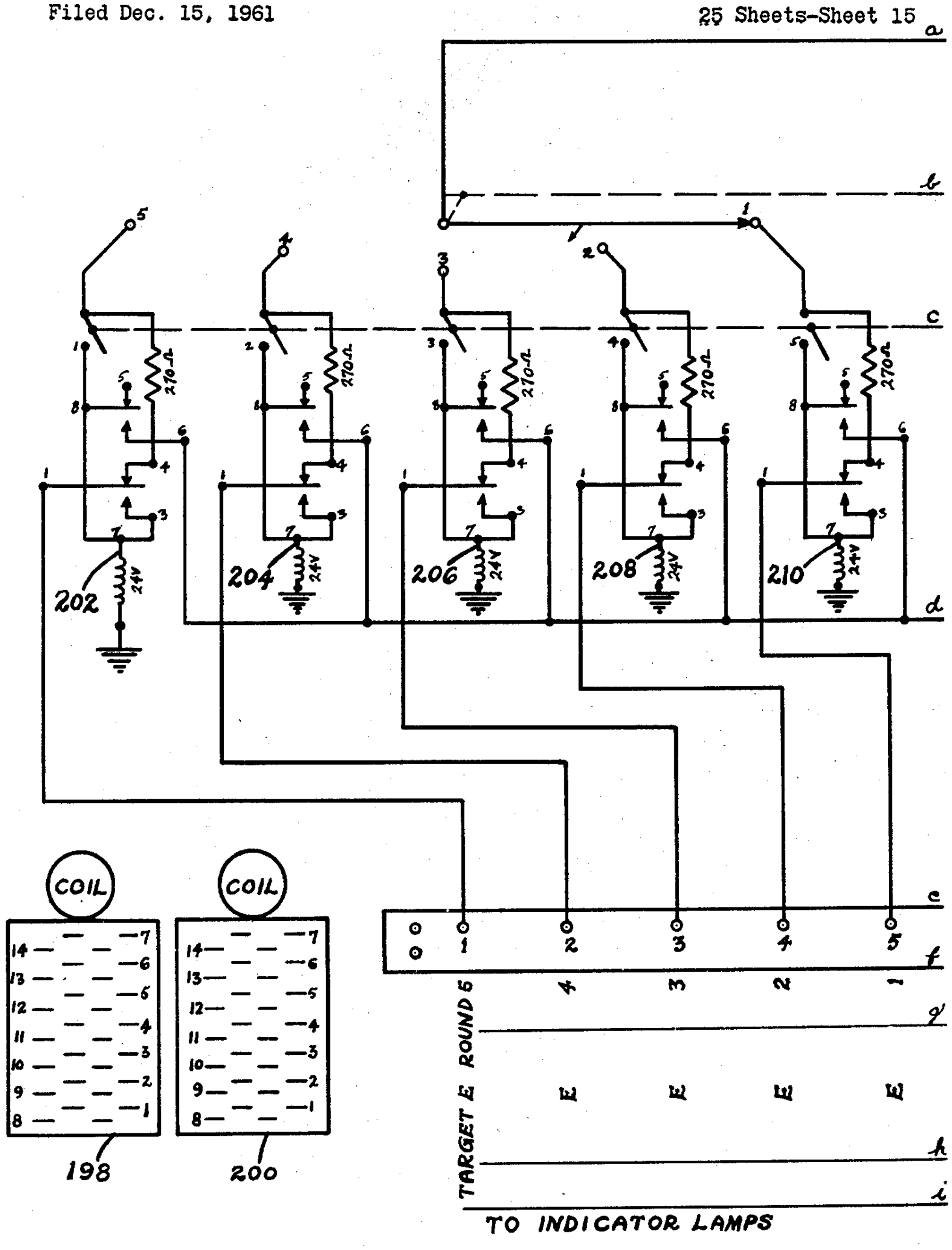
Figure 7B:
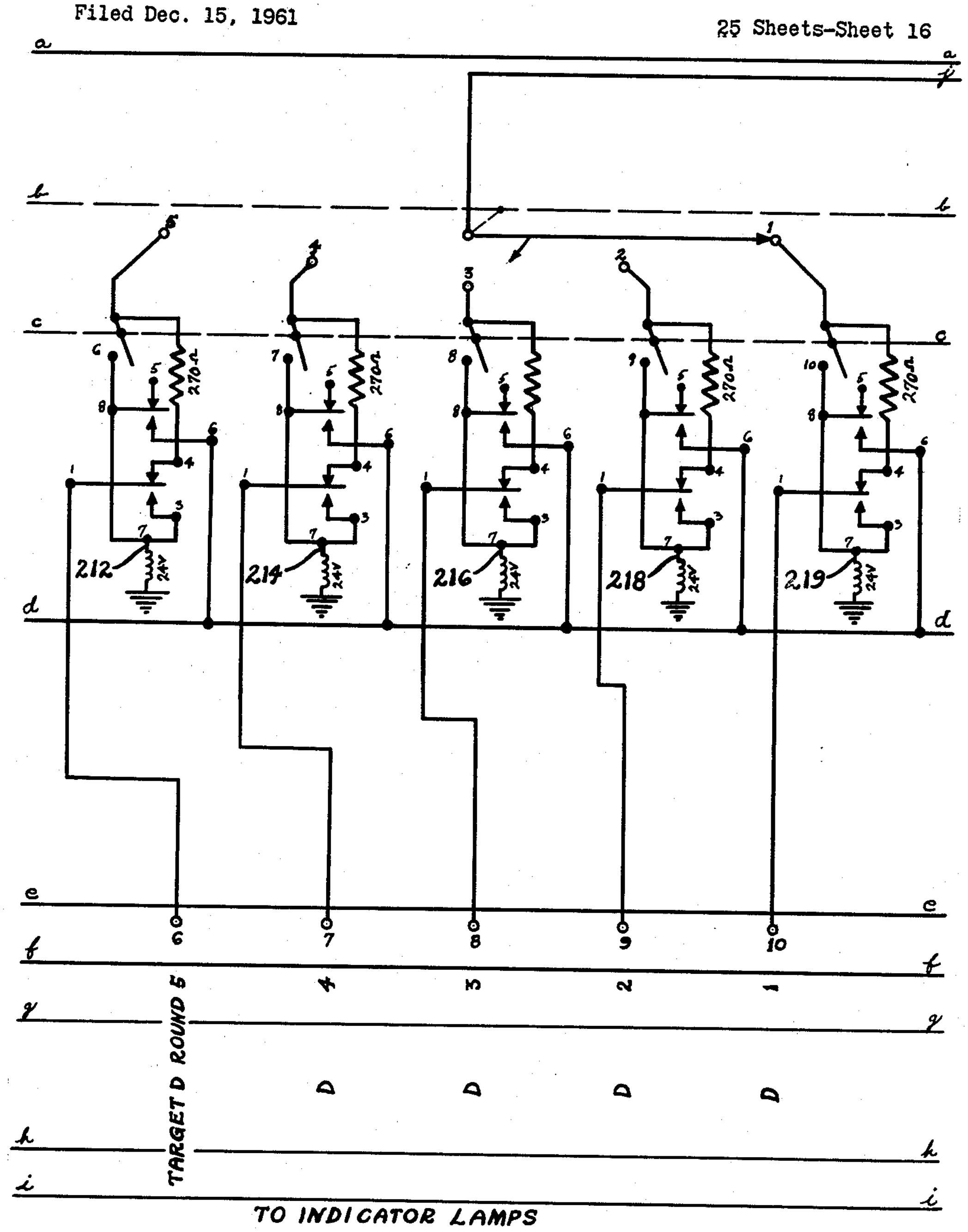
Figure 7C:
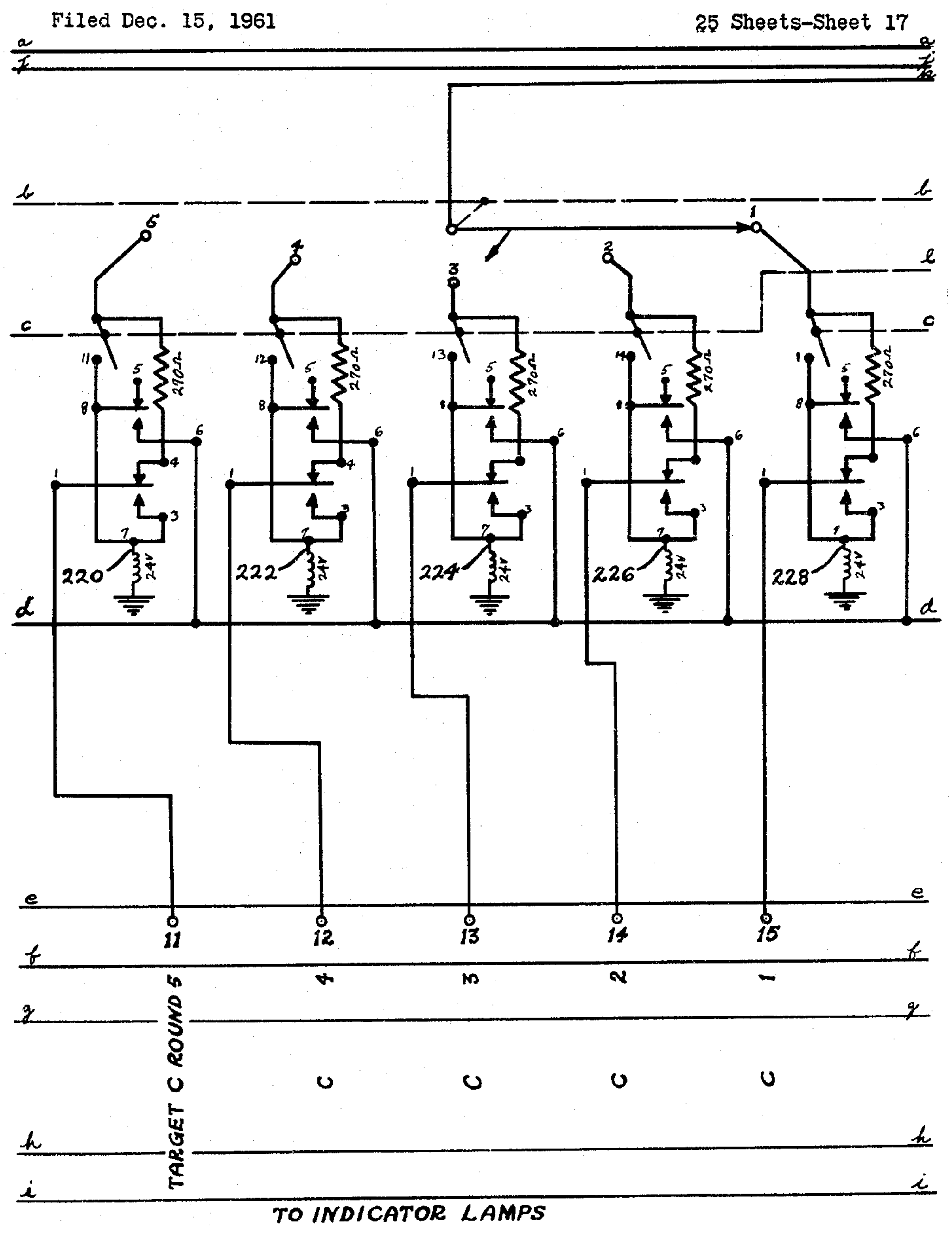
Figure 7D:
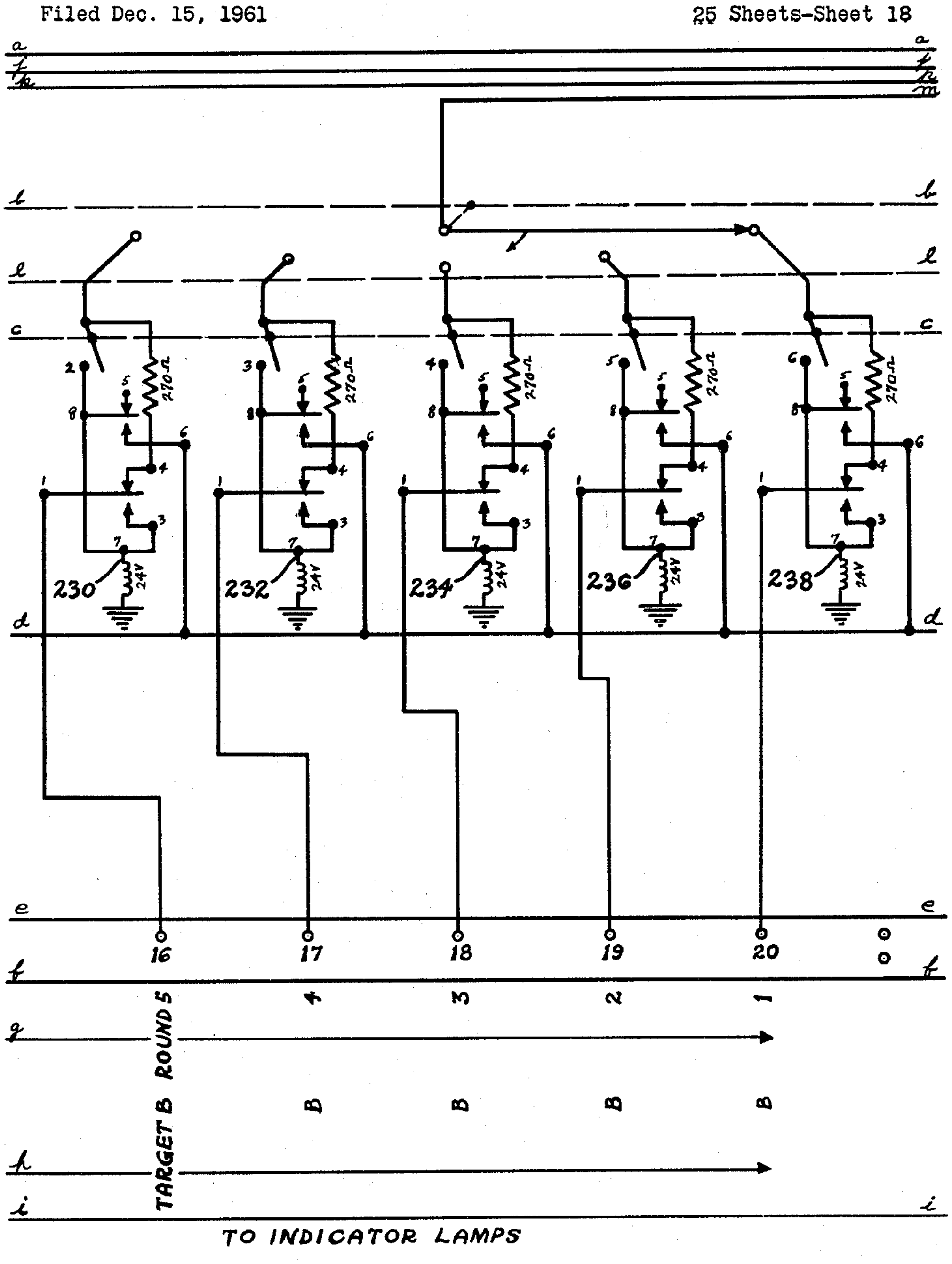
Figure 7E:
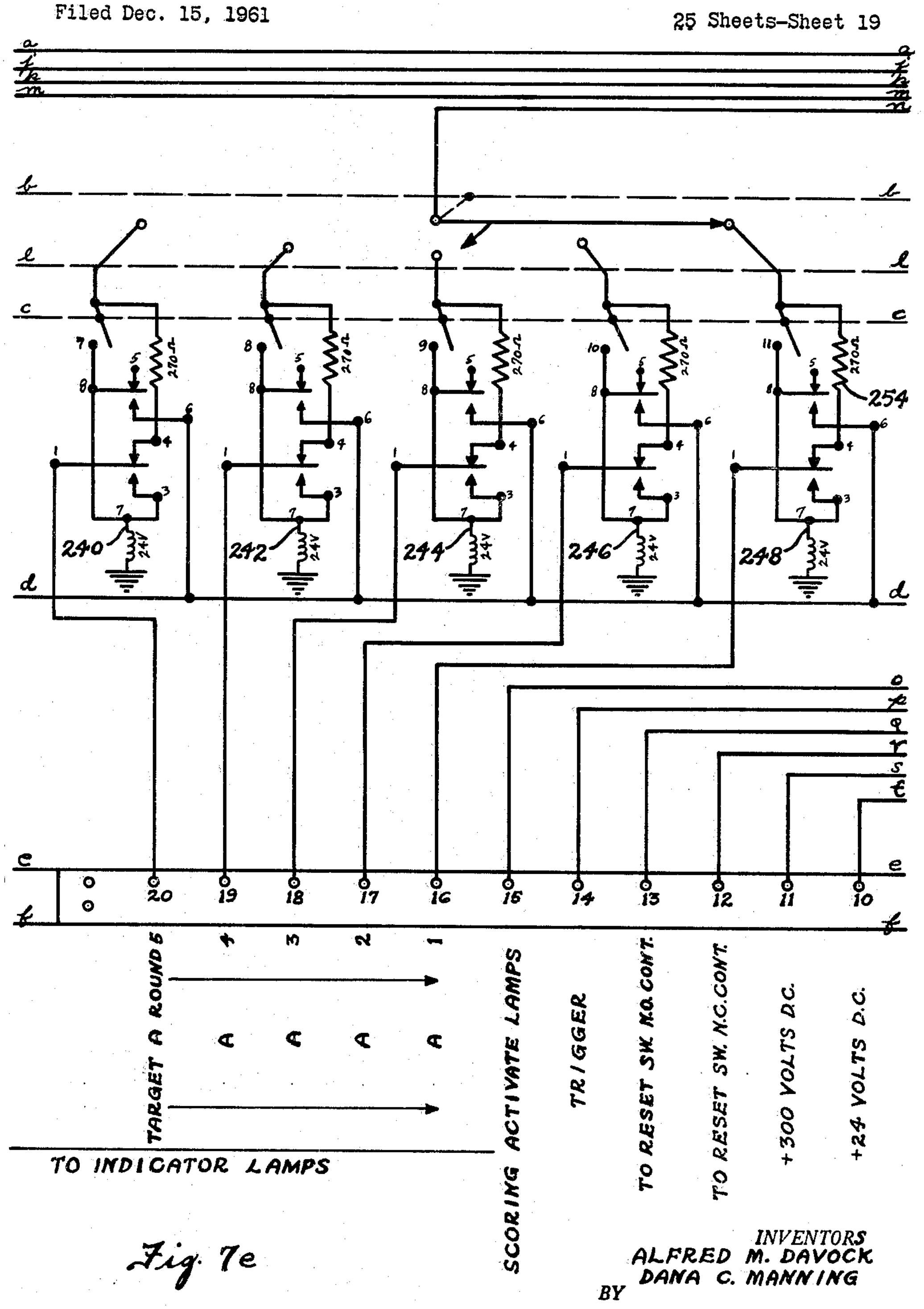
Figure 7F:
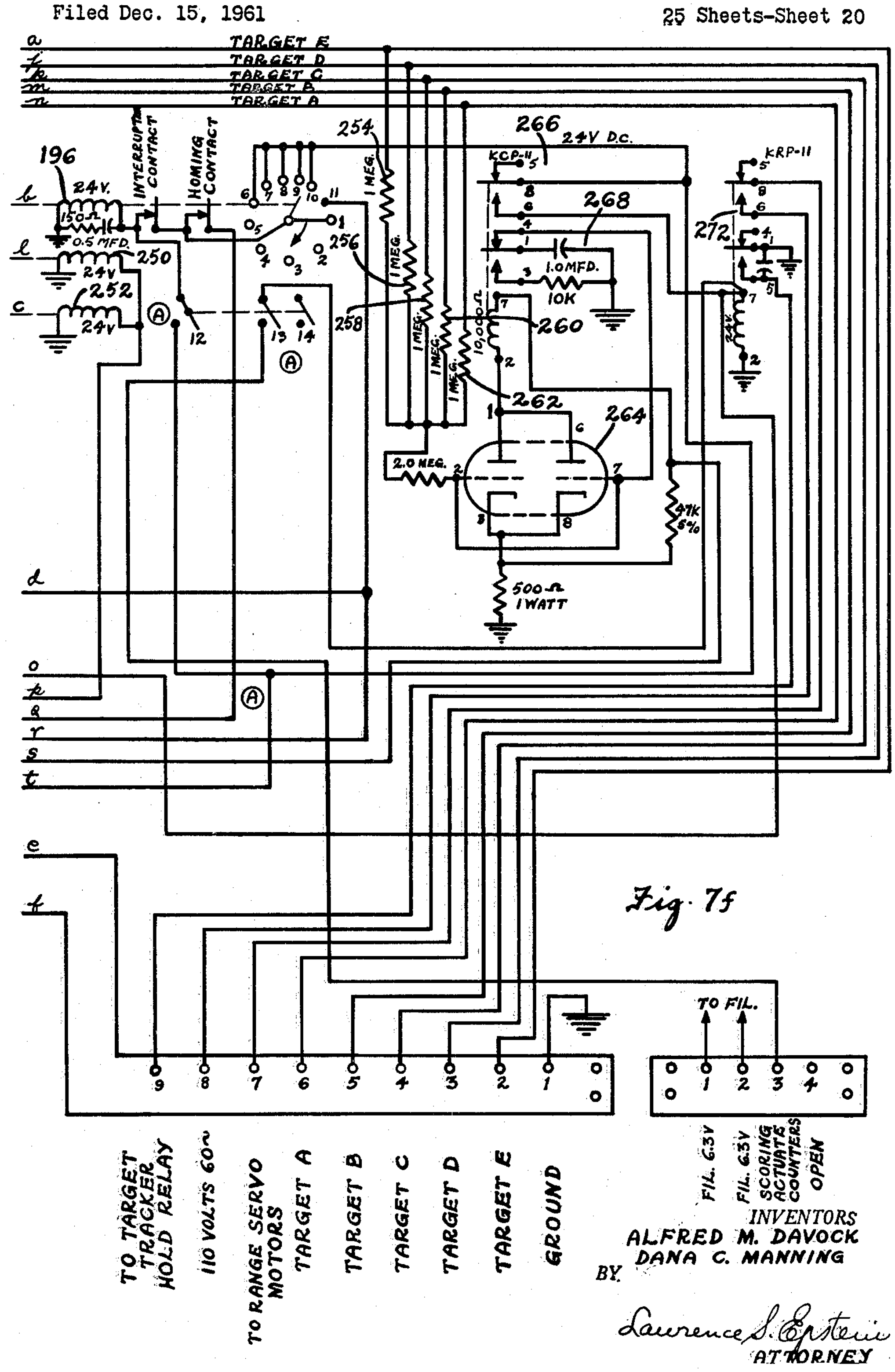
Figure 8A:
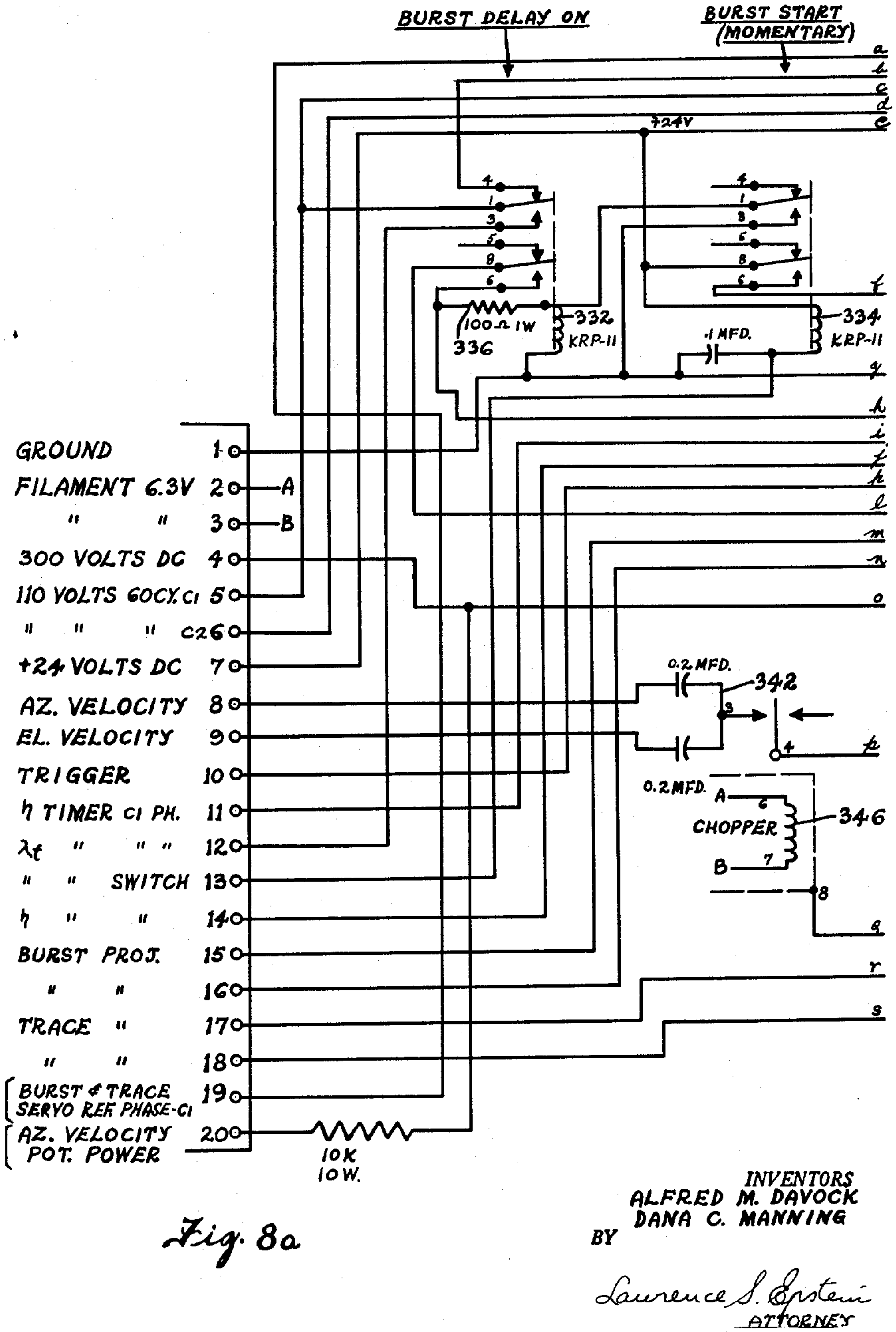
Figure 8B:
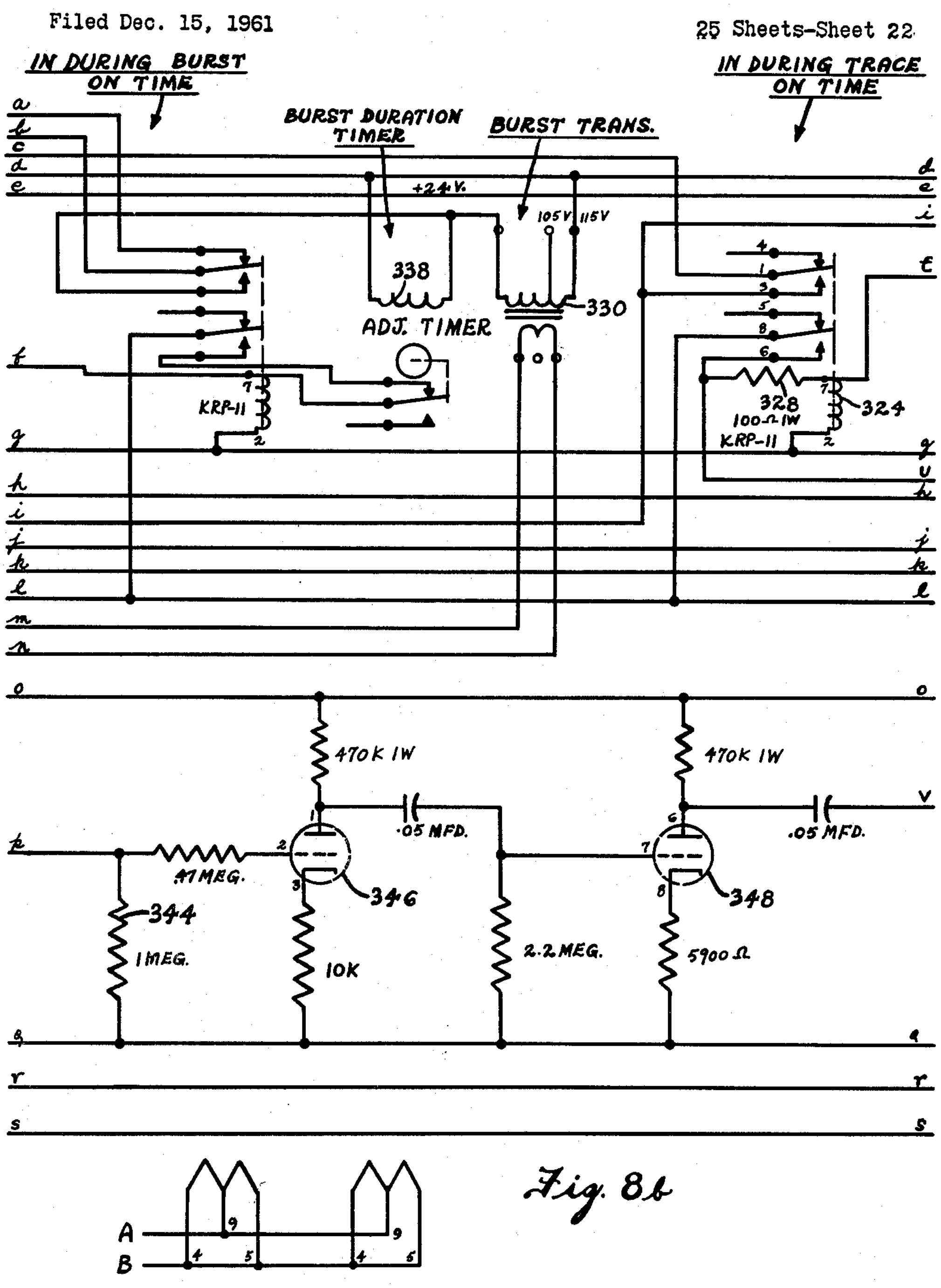
Figure 8C:
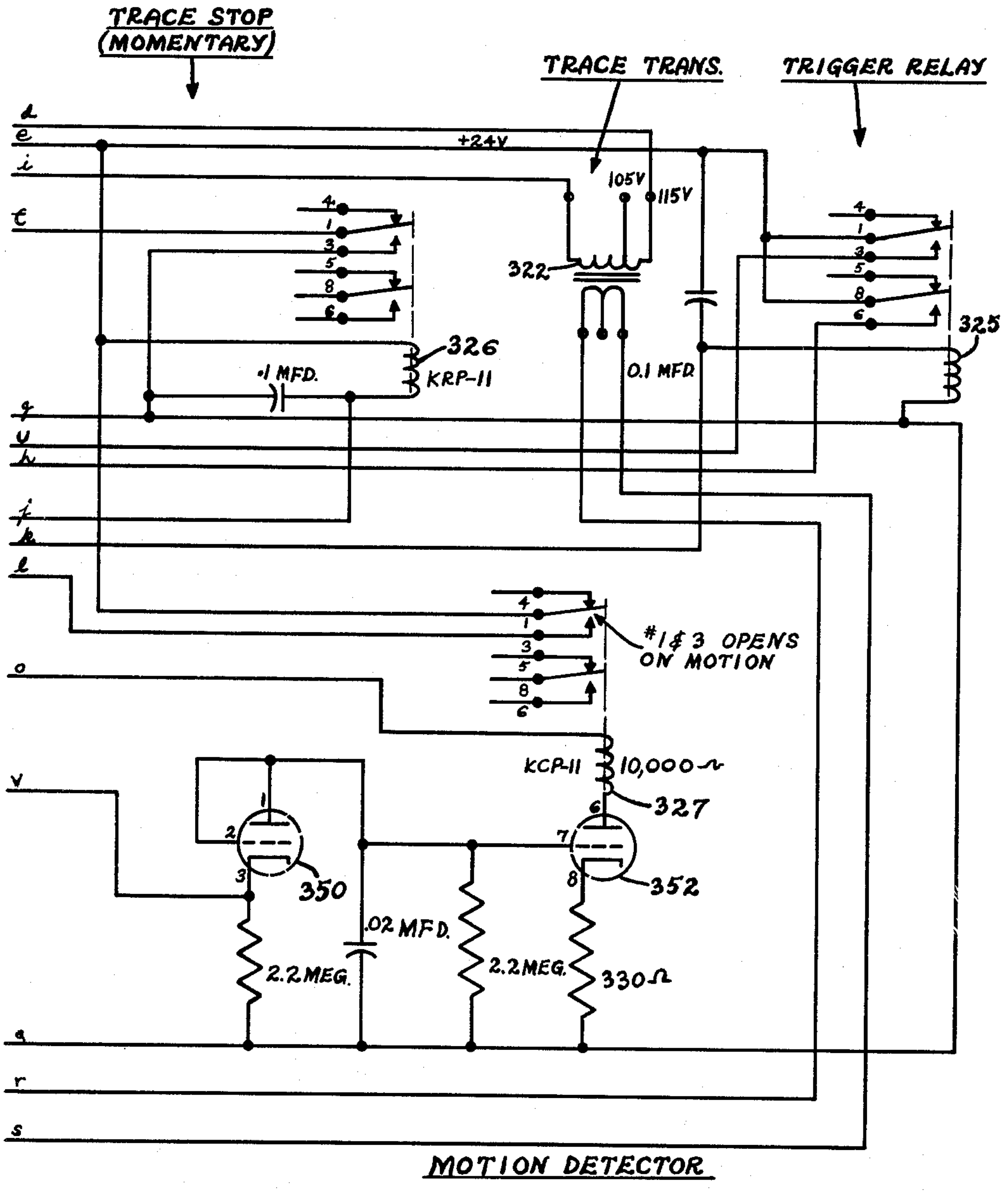
Figure 9A:
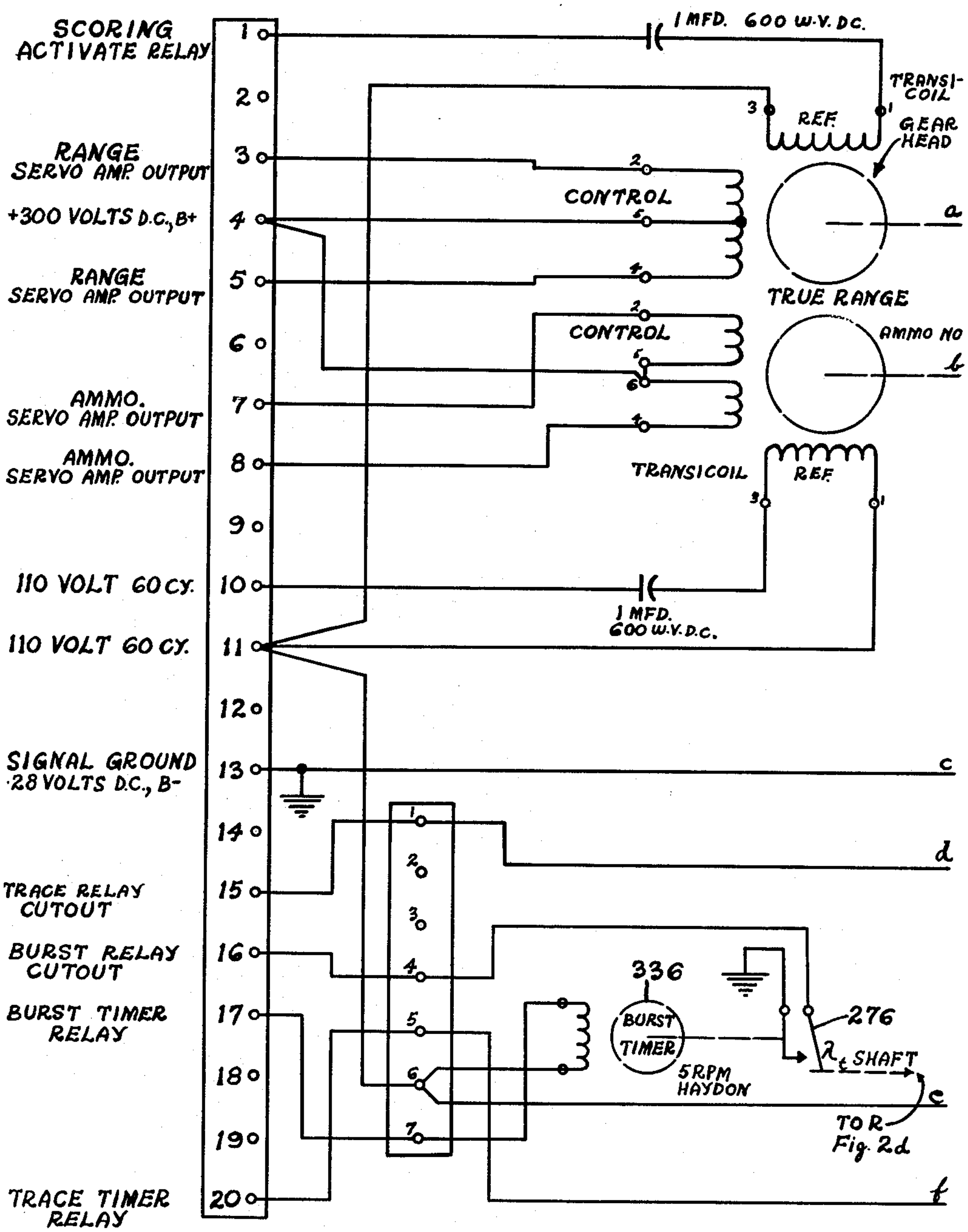
Figure 9B:
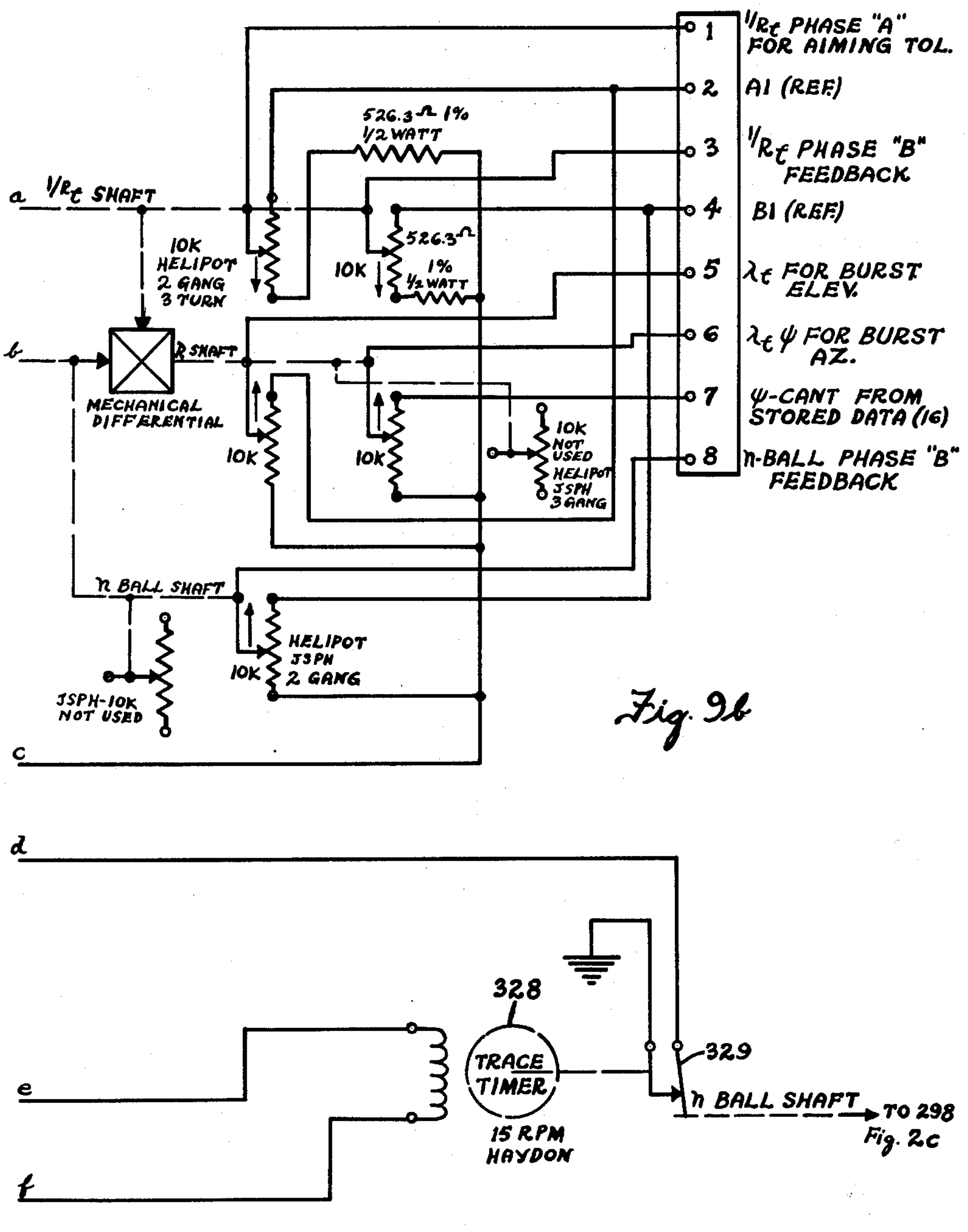

Other objects and many of the attendant advantages of this invention will be readily appreciated as the same becomes better understood by reference to the following detailed description when considered in connection with the accompanying drawings wherein:

FIG. 1 is a block diagram of the optical system of the rangefinder simulator;

FIGS. 2*a*–2*e* are block schematic diagrams of the electrical circuitry of the rangefinder simulator;

FIG. 3 is an isometric drawing showing the trainer, instructor and trainee in operating position;

FIGS. 4*a* and 4*b* are electrical schematic diagrams of the phase detector;

FIGS. 5*a* and 5*b* are electrical schematic diagrams of the stored data chassis;

FIGS. 6*a*–6*c* are electrical schematics of the azimuth detection circuits;

FIGS. 7*a*–7*f* are schematic diagrams of the target selected sequence indicator;

FIGS. 8*a*–8*c* are schematic diagrams of the burst trace trainer cutout circuit; and FIGS. 9*a* and 9*b* are schematic diagrams of the superelevation computer.

Referring to FIG. 1, the tank turret trainer comprises a hemispherical screen 10, a terrain projector 12, the turret and gun 14 and an instructor's console 16. The screen 10 is a spherical surface on which is projected the terrain area, the targets and the burst and trace display. It is of wooden frame and plastic construction in the preferred embodiment. The radius of the inside spherical surface is 12 feet. The screeen is placed relative to the turret so that the azimuth axis of the turret passes through the center of the screen and the horizontal or elevation axis of the rangefinder is forward and at the same height as the center of the screen. Although the turret can rotate to an angle of about 200 degrees the projected picture on the screen covers an angle of 60 degrees. The terrain projector is a 3,000 watt incandescent slide projector in the preferred embodiment.

The preferred embodiment of the turret 14 comprises a tubular frame with canvas covers which contain the turret power control system, a 90 mm. gun breech, a rangefinder and fire simulation assembly, turret accessories and the sound of vibration equipment. The turret is mounted on a portable stand by means of a large ball-bearing, approximately 7 feet in diameter. The general appearance of the turret is designed to closely simulate the appearance of the M–47 tank turret. The turret provides practice in operating the power controls and manual controls of the turret and guns of the M–12 rangefinder and the T–35 secondary sighting equipment.

Figure 2A:
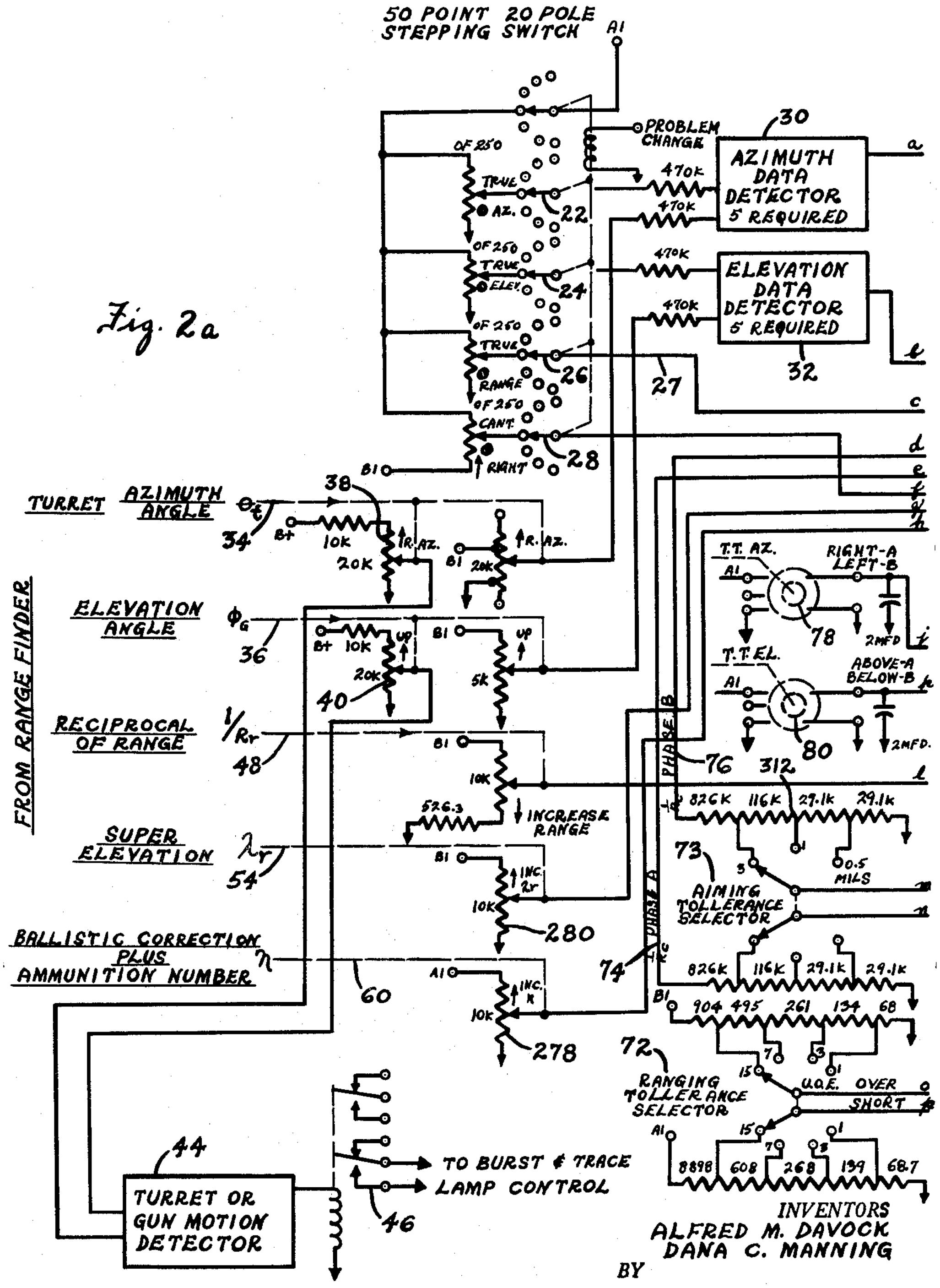

The student gunner 18 (FIG. 3) is presented with a selection of up to five targets in any one slide or problem. The data detectors select the proper range data for the particular target upon which the student is aiming. The first data selection is done by the instructor. When the instructor 20 operates his problem change switch, this positions four switches—five-pole, 50-position stepping switches to the proper data potentiometers for that problem. This operation selects a group of 16 of the total of 800 data potentiometers contained in the console. The voltage switches coming from these potentiometers represent the azimuth position of five targets, the elevation position of five targets, the range of five targets and the cant attack for this problem. These potentiometers are respectively shown as 22 for azimuth, 24 for elevation, 26 for range and 28 for cant on (FIG. 2*a*). The next selection is performed automatically by the azimuth and elevation data detectors 30 and 32 respectively (FIG. 2*a*). These detectors determine which target out of the five the student is aiming at and automatically switches in the proper true range potentiometer for the actual range of that target. All range data in the trainer varies in a reciprocal function with respect to range; i.e., when the ranges are large the voltages are small and when the ranges are small the voltages are large. The reason for this is that the output from the rangefinder is a reciprocal function of range and therefore must be compared with a similar function of true range in the trainer.

The inputs to the trainer computer are represented by Greek letters as follows. $\theta_t$ is the turret azimuth position 34 (FIG. 2*a*). This takeoff is accomplished in the modified turret azimuth indicator. $\phi_G$ is the gun or rangefinder elevation position 36 (FIG. 2*a*). This potentiometer is in the range compensator servo section of the rangefinder which will be described subsequently. $1/R_r$ is the rangefinder estimated range as a reciprocal function 48. This is obtained from the rangefinder. $\lambda_r$ is the superelevation angle 54 and is computed by the rangefinder. $\eta$ is the ballistic ammunition setting 50 of the rangefinder. This potentiometer is located in the rangefinder where it picks off the sum of the ammunition's knob position and the ballistic correction knob position.

Figure 2B:
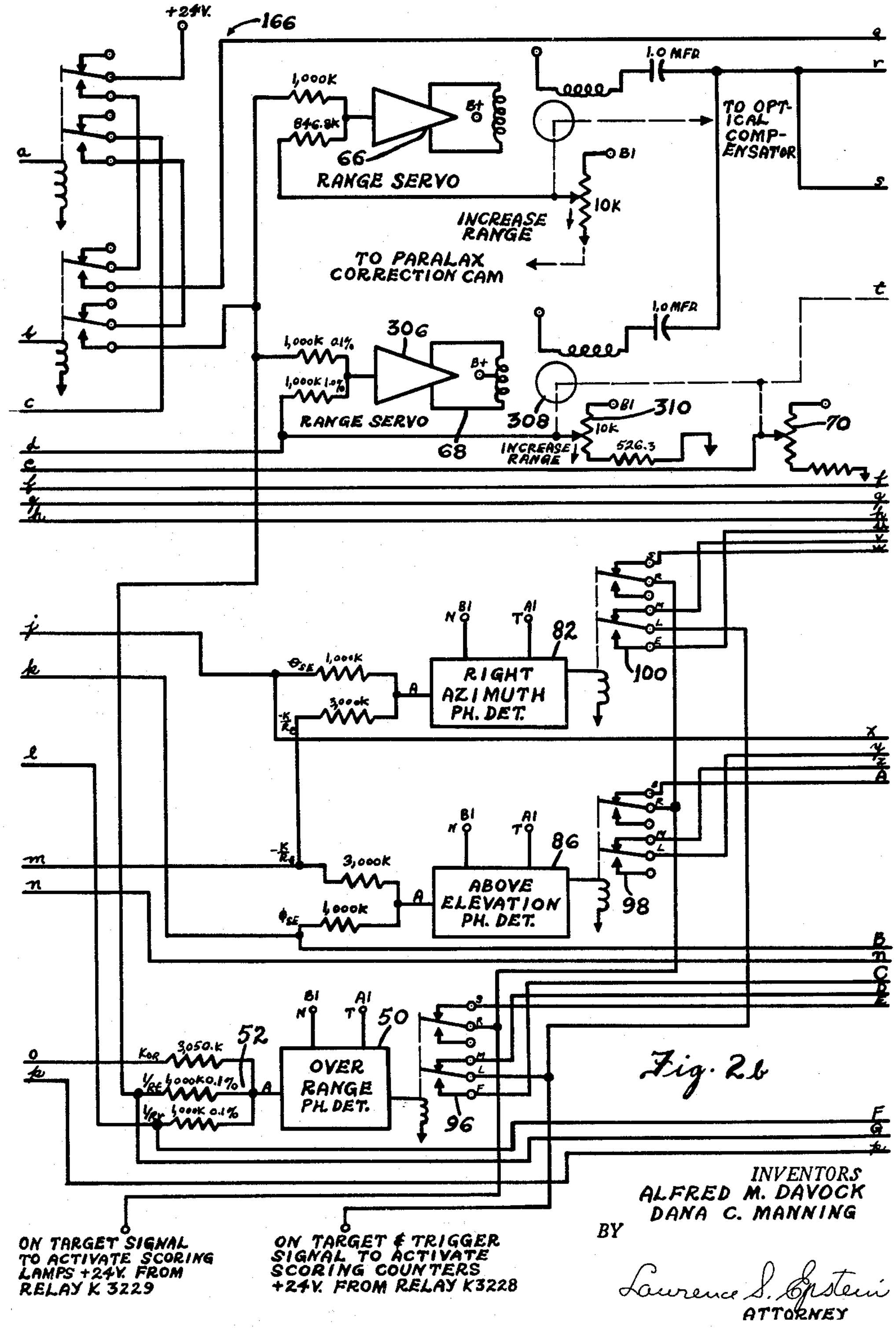

The turret azimuth and rangefinder elevation inputs 34 and 36 respectively (FIG. 2*a*) also have a second potentiometer 38 and 40 respectively which introduces a rate of velocity signal to the turret of gun motion detector 44 (FIG. 2*a*). The purpose of this detector is to cut off the burst or tracer display by means of relay 46 (FIG. 2*a*) as soon as the gun is moved to prevent a smeared burst or erroneous burst information. The turret azimuth position information is fed to the five azimuth data detectors 30 (FIG. 2*a*), where it is compared with the azimuth stored data. The elevation position data is likewise fed to the five elevation data detectors 32 (FIG. 2*a*) for the same reason. The rangefinder estimated range 48 is fed to the over and under range phase detectors 50 through summing resistors 52 (FIG. 2*b*). The rangefinder's superelevation angle 54 (FIG. 2*a*) is fed through summing resistors 55 (FIG. 2*e*) to the tracer elevation servo 56 (FIG. 2*e*) and through summing resistors 57 (FIG. 2*e*) to the burst elevation servo 58 (FIG. 2*e*). The input to the tracer elevation servo 54 (FIG. 2*a*) is added with the ballistic ammo signal 60 (FIG. 2*a*) and the position feedback signal from the tracer elevation servo drive 62 (FIG. 2*e*). The $\lambda_r$ signal 54 (FIG. 2*a*) is also summed with the $\lambda_t$ signal 57 and the position feedback signal for burst elevation servo 58 (FIG. 2*e*). True range signal 27 (FIG. 2*a*) is fed to four units of the trainer as follows:

the over-range phase detector 50 (FIG. 2b), the short-range phase detector 64 (FIG. 2c), the optical compensator true range servo 66 (FIG. 2b) and the true superelevation computer true range servo 68 (FIG. 2b). The true range signal is repeated by the feedback potentiometer 70 on the superelevation true range servo 68 and is fed to the aiming tolerance selector switches 72 (FIG. 2a) in two forms—phase A74 and phase B76. This makes the aiming tolerance voltages a reciprocal function of range. The aiming tolerance is greatest at short ranges where the targets are largest and smallest at long ranges where the targets are small. The aiming tolerance calibration in mils on the console panel is valid for 3,000 yard range only. The azimuth and elevation target sighting error is derived respectively from the azimuth and elevation target tracker synchros 78 and 80 (FIG. 2a). These synchros generate voltages proportional to the sighting error and of the proper phase for the direction of the error. The sighting error voltages $\phi_{se}$ and $\theta_{se}$ are respectively fed to the two azimuth 82 and 84 and two elevation phase detectors 86 and 88 (FIGS. 2b and 2c) for comparison with the tolerance voltages. A non-conducting or open relay condition on all phase detectors directs a hit to be scored. The ballistic ammunition number servo 90 on the superelevation computer 63 has two inputs, N (60) and feedback N (61) (see FIG. 2c). The superelevation computer 63 (FIG. 2c) comprises the range servo 68 (FIG. 2b), the range servo consisting of parts 306, 308, 310 and 70; servo 90 (FIG. 2c), comprised of parts 316, 318 and a feedback potentiometer; non-linear gearing 65, mechanical differential, ballistic cam and potentiometers 302 and 304 (FIG. 2d). The computer operates on the same principle as the rangefinder except at a reduced scale. The primary output of this computer 63 is $\lambda_t$ which is fed to burst elevation servo system 58 (FIG. 2e). Another output of the computer is a product of $\lambda_t$ cant $\psi$. These two factors are multiplied together and fed to the burst azimuth servo 92 (FIG. 2d) through a summing resistor 94. The burst time and trace time are also computed in this computer. The burst time is the time from firing until the burst appears and is a direct function of the true superelevation angle. The trace time is the duration of the trace and is the direct function of the ballistic ammunition servo position.

Figure 2C:
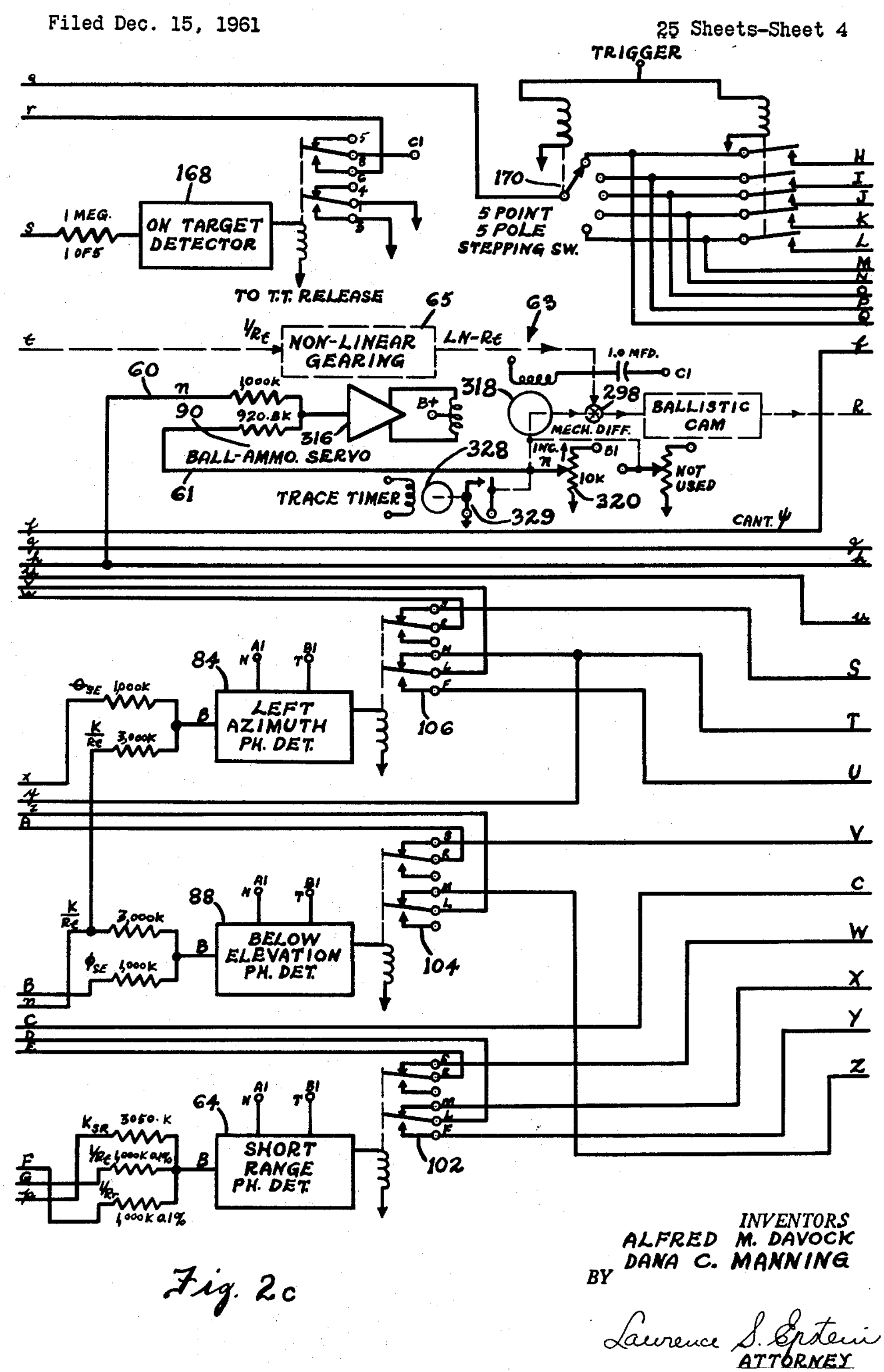
Figure 2D:
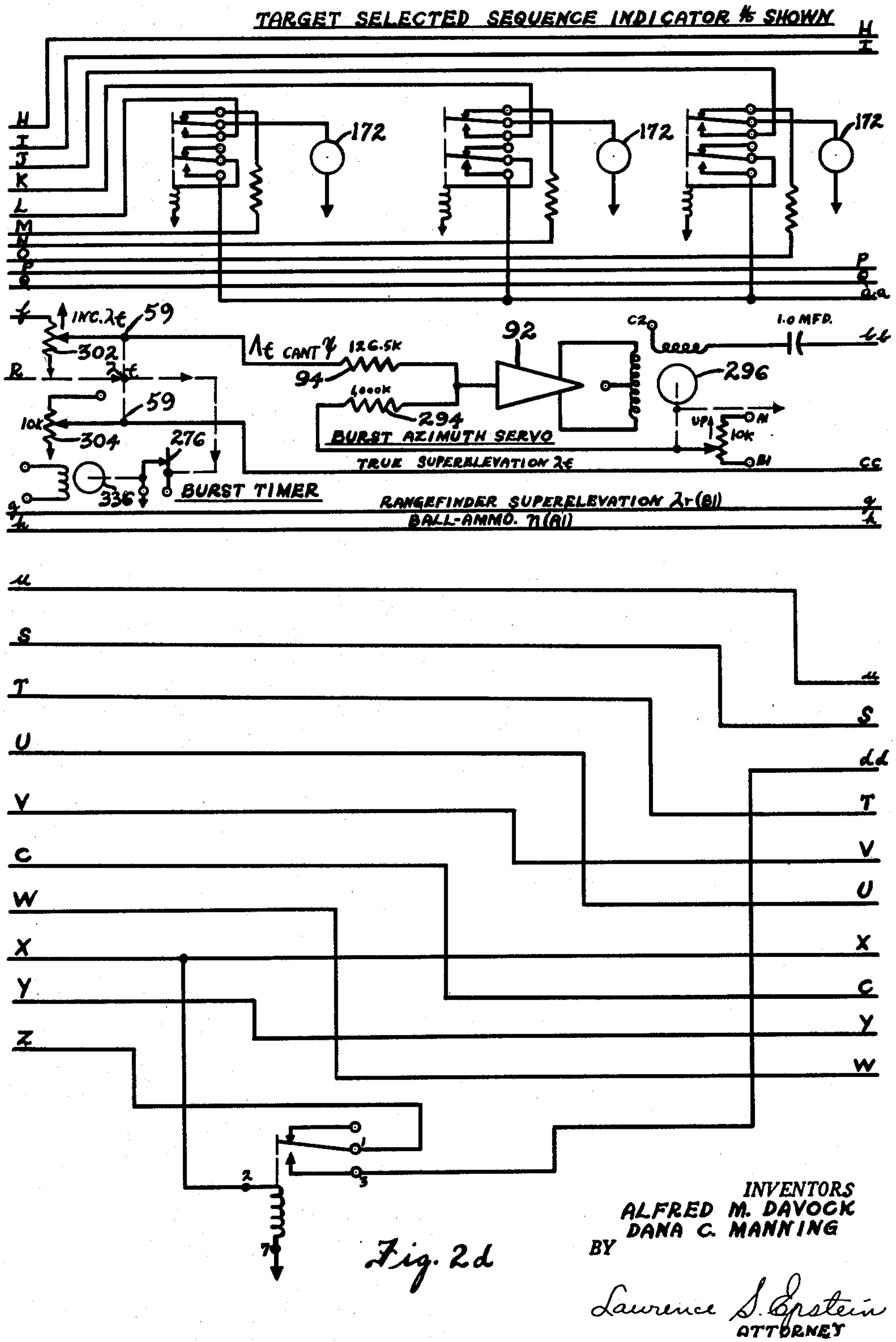
Figure 2E:
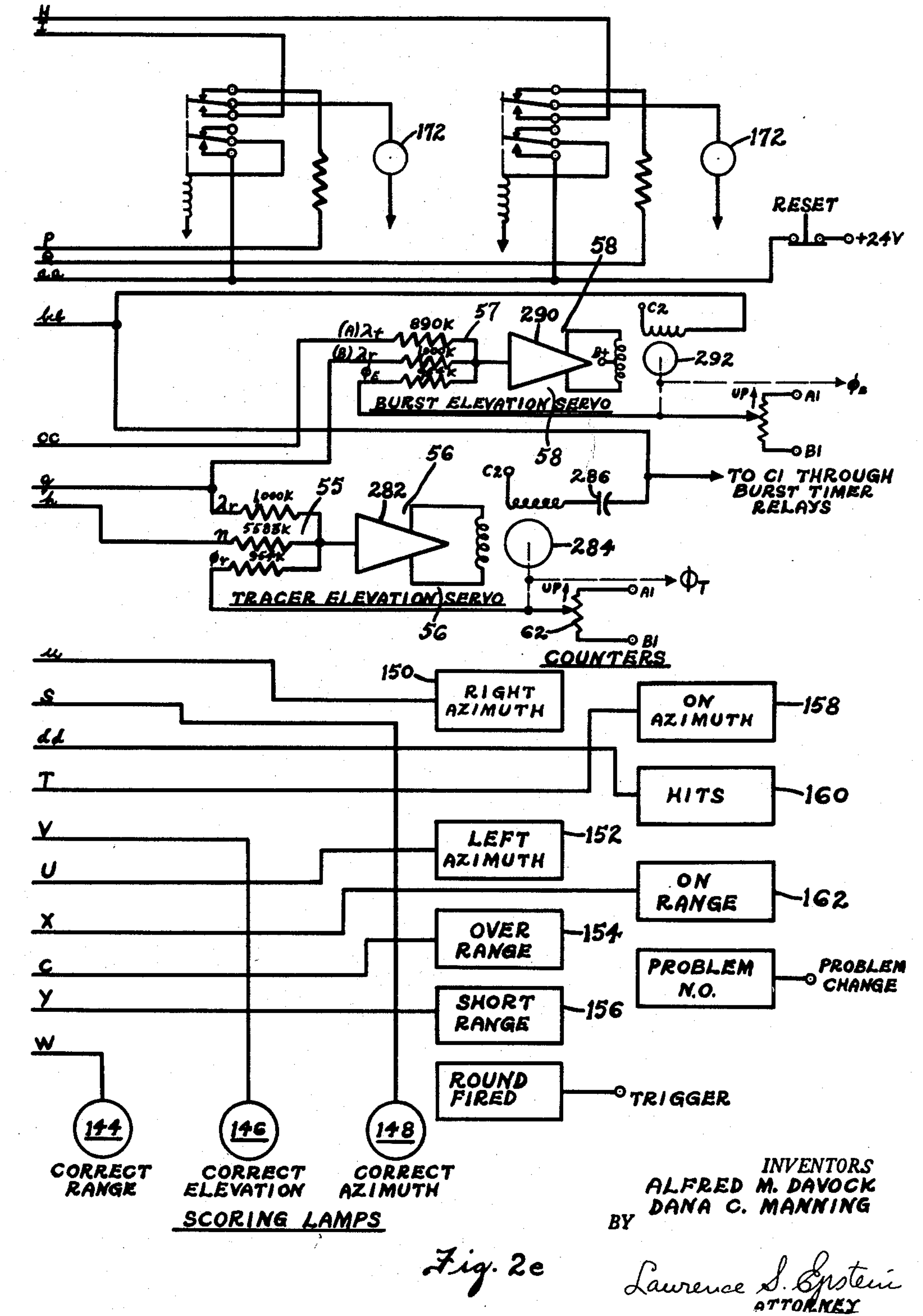

Six phase detectors are shown as 50, 86, 82, 64, 88 and 84 (FIGS. 2b and 2c). Associated with each phase detector is a relay, respectively 96, 98, 100, 102, 104 and 106. The operation of each of these phase detectors is identical and therefore only the operation of one of these phase detectors will be explained below. A typical phase detector schematic is shown in FIGS. 4a and 4b. The operation of the phase detector is as follows. Two or three 60-cycle voltage signals are fed to a voltage resistance adding network 108. The network consists of one resistor for each signal input which is connected in series with the signal. The detector end of each resistor is connected to the input grid terminal 110 of amplifier stage 112. The input signals can be either one of two phases, i.e., in phase with the line, phase A or 180 degrees out of phase with the line, phase B. When two signals of the same phase are fed to the detector input phase A+ (phase A), their effective values are added in the adding network. When two signals of opposite phase are fed to the detector input, phase A+ (phase B), their effective values are subtracted. The net input signal to the detector therefore is the sum or difference of all the input signals, phase A or phase B, depending on the relative value and phase of the input signals. The phase detector is made to respond to a very small input signal of one phase only. This minimal signal (about two millivolts) is amplified, detected or demodulated to a D.C. signal and made to operate a relay. If the input signal is of the correct phase, the demodulated signal will be of the correct polarity and the relay will operate. If the input signal is of the incorrect phase, the demodulated signal will be of the incorrect polarity and the relay will not operate.

A.C. amplifier stages 112 and 114 amplify the net input signal. Amplifier stage 116 feeds the amplified signal to the phase detector 118. Reference voltages of 50 volts, phase A and phase B, are connected to the phase detector at points 120 and 122. The reference voltage with the same phase as the net input signal to which the detector must respond to is set at terminal 122. The opposite phase is fed to terminal 120. When the net input signal corresponds in phase to the voltage at terminal 122 a negative D.C. voltage appears at the grid of 124. When the net input signal is opposite in phase to the voltage at terminal 122 a positive D.C. voltage appears at the grid of stage 124. These D.C. voltages are half-wave rectified components of the amplified net input signals. In this case the reference voltage which is fed to terminals 120 and 122 acts as a switching voltage which causes phase detector diode 118 to conduct at the proper time. Capacitor 126 together with resistors 128, 130, 132 and 134 act as a smoothing network to maintain the D.C. voltage during the rectified signal peak times. Triode 124 is a direct coupled amplifier which amplifies a D.C. signal which in turn, if the D.C. signal is negative, causes stage 136 to conduct thereby energizing relay 138. Stage 136 is normally cut off with the bias voltage obtained from resistors 140, 142 and 143. Relay 138 is not energized when there is no signal or when the signal is out of phase with the signal at terminal 122. In aiming tolerance a ranging tolerance voltage is fed from the instructor's tolerance controls to the phase detectors through an adding network. The aiming tolerance selector switch is 73 and the ranging tolerance selector switch is 72. Tolerance voltage is opposite in phase to the signal which must operate the detector. The signal then must exceed the tolerance voltage in order to operate the detector. The tolerance voltage is adjustable to provide 0.51 and 3 mil tolerances for azimuth and elevation aiming at 3,000 yards. The phase detector connection for the scoring circuit is shown on FIGS. 2a–2e. The scoring lamps are labeled "Correct Range," "Correct Elevation" and "Correct Azimuth" respectively 144, 146 and 148 (FIG. 2e). These circuits consist of series connected phase detector relays which act to pass the scoring activate lamp signal and the on target trigger signal to the proper counter or indicator light. The counters are shown respectively as right azimuth 150, left azimuth 152, over range 154, short range 156, on azimuth 158, hits 160 and on range 162. The control signals which operate these phase detector relays are fed from stored data potentiometers, M–12 rangefinder potentiometer data pickoffs and from target tracker synchro pickoffs. The stored data used here is the true range of the target at which the gunner is aiming. The rangefinder data is the gunner's estimation of the target's range. The target tracker synchro data determines azimuth and elevation aiming error.

The ranging tolerance voltage is a constant voltage proportional to units of error. Since units of error are proportional to the range squared it is necessary to add this tolerance to reciprocals of true range and estimated range. This solution is a close approximation to the actual situation since the sum of reciprocals of true range and estimated range is proportional to the range squared when the range error is small.

Aiming tolerances are proportional to the reciprocal of true range. The targets appear larger at shorter ranges and are easier to hit, while they appear smaller at long ranges and are more difficult to hit. Therefore, the aiming tolerances are large when the targets are close and vice versa.

Aiming error signals are obtained from target tracker synchros which indicate azimuth and elevation angular deviations of the gunsight from the exact target position. As the azimuth error changes from right to left and the elevation error changes from above to below, the aiming error signals from the synchros change from phase A to phase B. To the right and above is represented by a phase A signal. To the left and below is represented by a phase B signal.

Information from range, coarse azimuth angle and coarse elevation angle for each target is supplied artificially in order to accurately score the student gunner. Information which indicates the exact cant angle of the tank is also supplied artificially since cant is simulated by rotating the image on the target slide. These various data are supplied in the form of voltages which are taken from potentiometers located on the data chassis. These inputs are shown as 22, 24, 26 and 28 (FIG. 2*a*).

True range data, coarse azimuth data and coarse elevation data are stored for each of five targets on a slide. Also, cant data is stored for a slide. There are 16 data voltages, therefore, for each slide. The data storage system has a storage capacity for 50 slides or 800 data voltages. These voltages are obtained from 800 potentiometers which are located on the data chassis. In order to identify and locate each potentiometer and to pick up the desired voltage the following numbering and switching systems are used.

A four-digit number (not preceded by any letter) identifies each data potentiometer. The first two (left-hand) digits correspond to the slide number or problem number, these range from 01 to 50. The slide number appears on the terrain projector slide change disk next to the slide. The problem number appears on the problem number counter on the instructor's console scoring panel. The second two (right-hand) digits correspond to the data voltage code which ranges from 01 to 16. The table given below describes the data voltage code.

*Data numbering system*

| Stored data numbers | Located on chassis No. | Data description | Target priority |
|---|---|---|---|
| **01 | 0200 | Azimuth | A. |
| **02 | 0200 | do | B. |
| **03 | 0200 | do | C. |
| **04 | 0200 | do | D. |
| **05 | 0500 | do | E. |
| **06 | 0500 | Elevation | A. |
| **07 | 0500 | do | B. |
| **08 | 0500 | do | C. |
| **09 | 0800 | do | D. |
| **10 | 0800 | do | E. |
| **11 | 0800 | True range | A. |
| **12 | 0800 | do | B. |
| **13 | 1100 | do | C. |
| **14 | 1100 | do | D. |
| **15 | 1100 | do | E. |
| **16 | 1100 | CANT data for slide. | All targets. |

**Problem number.

A relative priority value is assigned to each target on a slide. This value is useful in training a student gunner in the tactics of tank gunnery. For example, Number 2915 means that this potentiometer is for the range of the target with an "E" priority on the 29th slide. Another example, Number 0407 means that this data potentiometer is for the elevation of the target with a "B" priority on the number four slide.

Four 24-volt stepping switches are used to connect data voltages to the scoring circuits and to connect power to the data potentiometers. These four switches act together in response to a problem change signal so that they may be considered as one 20-pole, 51-position switch 164 (FIG. 5*a*). Sixteen poles (or levels) are connected to the 16 data output circuits are described in the table above. Four poles feed power to the 16 potentiometers which are in use. Fifty positions provide connections for data for 50 slides, and one position is a home or OFF position. A schematic diagram of one of the four data chassis is shown in FIGS. 5*a* and 5*b*.

The coarse data detection system consists of an azimuth data detector 30, and an elevation data detector 32. These five detectors compare azimuth and elevation position signals, which are received from the turret, with the stored coarse azimuth and elevation data of the five targets on the selected slide. When the turret and gun position signals closely match the stored data signals of any target on the slide, the stored true range data for that target is fed to the scoring system. Also, a 24-volt on target signal 166 is fed from the data detectors to operate the target tracker release circuit 168, the range servo actuate circuit, the scoring actuate circuit 170 and, with a trigger signal, the target selected sequence indicator lamps 172.

A schematic diagram of a preferred embodiment of the azimuth detector circuits is shown in FIGS. 6*a* and 6*b*. Each detector consists of five vacuum tube operated relays 174, 176, 178, 180 and 182. Each relay circuit consists of an adding network 184, two amplifier states 186 and 188, a biased diode detector 190 and a relay power stage 192. The adding network for a relay circuit on the azimuth detector chassis receives signals from a corse azimuth data potentiometer and from the turret azimuth position potentiometer. The two signals, being of opposite phase, are subtracted in the network 184 and the difference is amplified. The diode detector 190 is biased to prevent conduction until the input difference signal reaches a certain value. When the turret azimuth position 194 differs from the stored data by 2½ degrees or more, the diode 190 conducts and produces a negative D.C. voltage which cuts off the relay power tube 192 and de-energizes the relay 174. When the relay is de-energized, the true range data and the 24-volt on target signal do not pass through the relay. When turret azimuth position coincides with the target within the 2½ degree tolerance, the relay is energized and the range data and on target signals pass through the relay to the elevation data detector 32.

Operation of the elevation data detector 32 is identical to that of the azimuth data detector 30 except that the gun elevation position signal and coarse elevation data are subtracted in the adding networks. When the gun elevation position and coarse elevation data for a target coincide within 2½ degrees, the range data and the 24-volt on target signals are fed through the coarse data detector relays to the scoring circuits through stepping switch 170.

The twenty-five indicator lights of the target selected sequence indicator 172 tell the instructor four facts about the student's performance. These are:

(1) When his sight is within ±2½° of a target.
(2) Which target he is aiming at.
(3) When he fires the 90 mm. gun at this target.
(4) How many rounds he has fired at each target and in what order they were fired (up to five).

The five horizontal rows are target priority rows, and the lamps in each row are lettered A, B, C, D, or E. Since up to five rounds can be fired at each target, there are five lights for each priority. These lights 172 are illuminated by means of relays on the target selected sequence indicator.

This circuit operates as follows: When the gun is on target within 2½ degrees, a 24-volt signal is fed through the azimuth coarse data detector 30 for that particular target to the elevation coarse data detector 32 for the same target. The result is that the voltage will be applied to a conductor representing the target at which the gun is aimed. There are five conductors representing the five targets which terminate at the five wiper arms of stepping switch 196 (see FIGS. 7*a*–7*f*). The sixth level of this switch is used for automatic advance over the unused positions of the switch. Each of the contact positions of the stepping switch is connected through a 270-ohm resistor and the back contacts of a holding relay to one of the scoring panel T.S.S.I. lamps. Thus, when a target is acquired, one of the T.S.S.I. lamps will glow dimly. As soon as the gun is fired, relays 198 and 200 will close. By virtue of the 24-volt signal now being fed to one of the 25 relay coils 196 and 202 to 252, one of these relays will close and latch in through the reset circuit and reset switch. This operation will apply full voltage of 24 volts to the lamp that was previously glowing dimly and bring it up to full brilliance.

The operation of holding relay 248 is typical of all 25 holding relays. It operates as follows: Assume that the gunner is aiming at target "A" and is about to fire round number one. The 24-volt on target signal is fed from the elevation coarse data detector to the wiper of the 196 stepping switch level "one" which has been stepped to position "one." From here, the signal is fed through light dimming resistor 254 and relay contacts one and four on 248 to the T.S.S.I. lamp A–1 on the scoring panel. 254 reduces the brightness of this lamp to about one-half of its normal value. When the trigger is pulled, relay 252 is energized, closing contact eleven. The 24-volt signal is then fed to the coil of 248, closing contacts one and three and feeding 24 volts to lamp A–1, bringing it up to full brilliance. Contacts five and six of 248 close feeding 24 volts to the relay coil 248 which then remains energized after trigger relay 252 has opened. As soon as the trigger is opened, the stepping switch advances to position number two. After five rounds have been fired, the instructor can open all of the holding relays by pressing the T.S.S.I. reset button on the scoring panel. This opens the 24-volt relay holding circuit, and homes the stepping switch 196 to position "one."

As mentioned above, the on target 24-volt signal from the coarse data detectors has several other functions. These are all performed on the T.S.S.I. chassis. As shown in FIGS. *7a–7f*, the five on target signals are fed to an adding network 254, 256, 258, 260 and 262. A 24-volt signal applied to any one of these resistors produces about +5 volts at the grid of tube 264. This causes the tube, which is normally cut off by forced bias, to conduct and energize the scoring actuate relay, 266. A time delay capacitor 268 is connected from the signal path to ground to delay operation until the on target signal has been on for a few seconds. This is to prevent the circuit from operating when the gun passes quickly or accidentally over a target area. The on target signal must change capacitor 268 before 264 will conduct. When relay 266 is energized, contacts one and three are closed and capacitor 268 discharges through 270, thus preventing a delay in relay opening. Also, contacts eight and six close, feeding 24 volts to the range servo actuate and target tracker release relay 272 and to the "scoring actuate counters" and "scoring actuate lamps," circuits. Relay 272 releases the target tracker for tracking a target spot by providing a ground connection through contacts one and three. Capacitor 268 prevents arcing at these contacts when opening. Contacts eight and six close when relay 272 is energized, feeding 110 volts, 60 cycles to the reference field winding of the range servo motors. Thus, the range servos cannot operate without a target and without range data.

The "scoring actuate lamps" signal is a 24-volt signal which operates the correct azimuth, correct elevation and correct range lamps through the phase detectors. The "scoring actuate counters" signal is a 24-volt signal which operates the scoring counters through contacts number 13 of trigger relay 252 and the phase detectors.

The third aid which the instructor and students have in determining the success of a training problem is the projection of the burst and trace of the simulated round.

Timing of the burst and trace projection is done by means of synchronous clock motors 274 and 276. The trace spot appears immediately after the trigger is pulled. It remains on the screen 10 until the simulated projectile has reached a range of 1,000 yards. This time is controlled by the ammo number.

The burst spot is delayed until the simulated projectile has traveled the range of the target. This time is proportional to the true superelevation angle in mils. The burst spot has an adjustable duration time of from one to fifteen seconds.

Trace projector position is controlled by signals from an ammo number potentiometer 278 and an estimated superelevation potentiometer 280 in the rangefinder. These two signals are fed to an adding network at the input to a servo amplifier 282 where they are added with the servo feedback signal. The net input to the amplifier, or sum of the input signals, is amplified and fed to the control field of a servo motor 284. A reference field on the servo motor is excited by 110 volts, 60 cycles through a 1-mfd. capacitor 286 which changes the phase of the excitation by 90 degrees. The servo motor, in turn, drives the trace projector through a vertical angle which is the elevation angle of the trace or below the line of sight.

The burst projector elevation position is determined by a signal from the estimated superelevation potentiometer 280 in the rangefinder and a signal from a true superelevation potentiometer 304 in the true superelevation computer. The burst elevation is proportional to the difference of these signals or the superelevation error. These two signals are added in a manner similar to those for the trace projector, are amplified by servo amplifier 290 and are used to control the burst elevation servo motor 292. The elevation angle of the burst projector is the angle of the projected burst above or below the line of sight.

The third and final servo drive is burst azimuth. This angle is determined by the true superelevation angle and the cant angle. It is proportional to the product of these quantities which is fed to the adding network of servo 92, from the true superelevation computer. Added to this product is the burst azimuth servo feedback 294. The net input signal to the amplifier is then amplified and used to excite the control field of servo motor 296. Burst azimuth angle is the angle of the projected burst right or left of the line of sight.

The true superelevation computer consists of the range servo 68, the ballistic ammo servo 90, a mechanical differential 298, the ballistic cam 300 and associated gearing. The non-linear gearing 65 is a very important function of the computer as it changes $1/Rt$ to $l_nR_t$. The range servo 66 produces a shaft position proportional to the reciprocal of true range. The ballistic ammo servo 90 produces a shaft position proportional to the position of the ballistic ammo shaft in the rangefinder. These two shaft positions, or rotations, are added through a gear and differential system which rotates the ballistic cam. The cam follower, in turn, rotates two potentiometers, 302 and 304. The cam follower angle and therefore the angle of the two driven potentiometers represents the true superelevation angle. The computer gearing and ballistic cam are similar to those used in the rangefinder. Since the data fed into the computer are ammo number, and ballistic correction just as in the rangefinder, plus true range, the output data represents the true superelevation angle. This data is then used in the burst projector servos to compute burst azimuth and elevation angle.

The range servo 68 on the computer is controlled by a true range data voltage fed to the amplifier adding network through the coarse data detectors 30 and 32. The range servo feedback signal is added to the input signal in the network, and the net input signal is amplified by amplifier 306 and fed to the control field of servo motor 308. The servo motor drives, in addition to its mechanical load, a feedback potentiometer 310 and a range data potentiometer 70. The feedback potentiometer 310 produces a phase B voltage proportional to true range which is fed to the range servo amplifier 68 input and also to an aiming tolerance voltage divider 312 for the right azimuth and above elevation phase detectors. The range data potentiometer 70 produces a phase A voltage proportional to true range which is fed to an aiming tolerance voltage divider 314 for the left azimuth and below elevation phase detectors.

The ballistic ammo servo 90 is controlled by a ballistic ammo signal fed to the amplifier adding network from potentiometer 278 in the rangefinder. The ballistic ammo servo feedback signal is added to the input signal in the network, and the net input is amplified by 316 and fed to the control field of servo motor 318. The servo motor drives a shaft input to the mechanical differential and a potentiometer 320. This potentiometer produces a phase B voltage proportional to ballistic ammo shaft rotation, which is the feedback signal.

Potentiometers 302 and 304 are rotated by the ballistic cam follower. 302 is fed by a voltage proportional to cant from a cant data potentiometer 28. This signal is phase A when cant is to the right and phase B when cant is to the left. The output of 302 is proportional to cant times true superelevation and is fed to the input of the burst azimuth servo. Potentiometer 304 is fed by phase A reference voltage. The ouput is proportional to true superelevation and is fed to the input of the burst elevation servo.

Operation of the trace timer is as follows: The trace appears when the trigger is pulled, lasts for a time proportional to ballistic ammo number, and is cut off. The trace projector lamp is fed by the secondary winding of transformer 322 (see FIG. 8). The primary is fed 110 volts, 60-cycle power through normally open contacts on relay 324. This relay is energized during trace "on" time. Relay 324 is energized by 24 volts D.C. through trigger relay 326 which is in momentarily when the trigger is pulled. Relay 324 is held in after the trigger relay drops out by 24 volts through holding contacts six and eight on relay 324 and through detector relay 327. Relay 324 is dropped out at the end of the trace on time by shorting out the relay coil through contacts one and three on trace stop relay 326. This is permissible since resistor 328 prevents excessive short circuit current from flowing during the momentary shorting condition, although resistor 328 does not produce enough voltage drop to prevent reliable operation of relay 324 when closing. Relay 326 is energized by closing the coil circuit to ground through the ballistic ammo timer switch 329 on the true superelevation chassis (see FIG. 9).

The ballistic ammo timer 328 consists of a synchronous timing motor and two movable contacts forming switch 329. One of these contacts is rotated by the timing motor and is connected to ground. The other contact is rotated by the ballistic ammo servo shaft and is connected to the coil of trace "stop" relay 326. The ballistic ammo servo shaft rotates this contact through part of one revolution, the distance being proportional to the ballistic ammo signal from the rangefinder. In summary, when the trace "on" relay 324 is energized by a trigger signal, the timing motor 328 is energized and its output shaft rotated through part of one revolution until the timer contacts close. When these contacts close, relay 325 is energized, relay 324 drops out, the trace projector lamp is turned off, and the ballistic ammo timing motor is de-energized. When the timing motor is de-energized, the timer contacts are returned to the original starting position by the torsion spring.

Operation of the burst delay timer is as follows. The burst appears at the end of a delay period corresponding to the time of flight of the ammunition used. In the trainer, this delay is proportional to the true superelevation angle of the gun. The burst projector lamp is fed by the secondary winding of 330 (see FIG. 8). The primary is fed 110 volts, 60-cycle power through relays 332 and 334. Burst delay relay 332 is energized by a 24-volt momentary trigger signal from trigger relay 326. Holding contacts six and eight serve to hold "in" 332 after the triger relay drops "out." Contacts one and three close, feeding 110-volt power to the true superelevation timer 336 (see FIG. 9).

The true superelevation timer consists of a synchronous timing motor 336 and two movable contacts 276. One contact is rotated by the timing motor and is connected to ground. The other contact is rotated by the true superelevation shaft and is connected to the coil of the burst start relay 334. The true superelevation shaft rotates this contact through part of one revolution, the distance being proportional to true superelevation. The true superelevation timing motor shaft rotates until the timer contacts close, completing the ground circuit of the coil of burst start relay 334. When this happens, 334 is energized, and contacts one and three short-circuit the coil of burst delay relay 332. Current limiting resistor 336 prevents excessive short-circuit current while permitting 336 to operate on the normal 24 volts. When the coil of 332 is shorted, the relay drops out. This causes the holding contacts six and eight to open and one and four to close, thereby feeding 110 volts to contact one or burst "on" relay 334. When burst "start" relay 334 is energized, contacts six and eight feed 24 volts to the coil of burst "on" relay 334. When 334 pulls in, holding contacts six and eight close, feeding 24 volts to the coil through contacts on 330. At the same time, 110 volts is fed through contacts one and three to the burst projector lamp transformer 338 and to the burst duration timer 336.

Operation of the burst duration timer is as follows. The timer 338 consists of a synchronous motor geared to an output shaft which rotates through part of one revolution and operates a switch. The time required for the shaft to operate the switch is set by manually adjusting the distance through which the shaft must rotate. When the timer contacts open at the end of the burst "on" time, relay 334 is de-energized and the entire circuit is reset and ready for the next sequence. Each of the timers discussed incorporates a spring return on the timing motor shaft. Also, when either the burst delay relay 332 or the burst "on" relay 334 is energized, the 110-volt reference voltage to the burst and trace drive servos is interrupted and the servos are inoperative. This is accomplished by feeding this reference voltage through normally closed contacts one and four on 332 and 334 connected on series.

When the burst or trace spot is projected on the screen, it is important that the burst and trace projectors do not move. Any movement during this time would be immediately apparent since the burst or trace would appear to move on the screen. This would tend to destroy the effect of the simulation. To prevent this occurrence, two things are done. First, as discussed above, the burst and trace servo motor reference voltages are cut off during the burst and trace projector time. The servos, therefore, cannot drive the projectors during this time. Second, since the burst and trace projectors are mounted on the turret and move with the turret and gun, a turret and gun motion detector is incorporated which interrupts and resets the burst and trace timing if the turret or gun moves.

The motion or rate detector operates as follows. Potentiometers are coupled to the turret azimuth indicator and to the rangefinder in tandem with the turret and gun position potentiometers. These pots are fed a D.C. voltage, and the wiper output voltage is fed to the timer chassis. These output voltages are constant D.C. voltages as long as the turret and gun are motionless. If either turret or gun move, one of these voltages will change. These signals are each fed to a series capacitor 340 and 342. The output side of both capacitors is connected to ground through a chopper contact and a resistor 344. Any change in either input signal will cause current to flow in resistor 344 in a direction which will change the charge on either 340 or 344. This current is periodically interrupted by the chopper 346 so that it appears as a pulsating D.C. current. This current produces a pulsating D.C. voltage at the grid of 346. This pulsating voltage is amplified in capacity coupled amplifier stages 346 and 348 and produces an A.C. voltage at the cathode of 350. In tube 350 the A.C. voltage is rectified, producing a negative D.C. voltage at the grid of tube 352. Tube 352 is biased to conduct just enough current to energize relay 327. Contacts one and three on relay 327 are then closed and feed 24 volts D.C. to the burst delay relay, burst on relay and trace on relay. When the motion detector input signals produce a negative D.C. voltage at the grid of 352, this tube is cut off, relay 327 is de-energized and the 24-volt supply to the timers is cut off. This action shuts off the burst and trace projector lamps and resets the timers. The burst and trace can only be displayed when the turret and gun are motionless.

The operation of the tank turret trainer is as follows. The main components of the device comprise a simulated M47 tank turret mounted so that it rotates on a specially designed stand 302, a 12 foot radius hemispherical screen 10 and a terrain projector 404 which projects wide-angle photographic slides of real targets and backgrounds, tracer 406, burst 408 and point of air projectors and an instructor's console 20 which controls all the functions of the trainer and registers proficiency of the crew. The turret interior is fitted with all the operational gear controls and sighting instruments used in the tactical tank. The main gun has been modified to recoil when the special ammunition developed and furnished with this device is fired. The special 90 mm. training round is designed so as to separate when fired. A patent application covering this separable round is co-pending application, Serial No. 233,494. The projector 404 mounted on the stand behind the turret projects a still 60 degree picture on the inside of hemispherical screen. The projected picture is contained on a 3¼" x 4" glass slide plate. Up to five targets may be provided on each of the slides. Inclusion of more than one target per slide creates a problem of determining which target is of higher priority strategically. The ability to select the proper target is registered on a bank of lights on the console. Twelve slides are carried on a disk mounted to the projector mechanism. The slide exposed is controlled by the problem number switch on the console. The trainer will accommodate a total of 50 problems or slides. The slide also contains a projected reference spot for each target. This spot, not visible to the trainee with the hatch closed, provides the appropriate azimuth and elevation reference data for each target. The provision of this reference information as a projected spot rather than as a coding on the slide permits errors to occur in the positioning of the slide during projection without affecting the accuracy of the scoring system. The target's terrain and the burst and tracer displays are projected on the interior of a hemispherical screen 12 feet in radius. The turret rotates about the vertical center of the screen. The horizontal axis of the rangefinder passes through the center of the screen. The stereoscopic rangefinder is described in copending application, Serial No. 159,798, now abandoned.

The burst, point of aim and tracer projectors are mounted on a plate on the upper surface of the rangefinder. The burst projector gives immediate indication to the trainee of his success in hitting the target.

This indication is in the form of a momentary, adjustably timed spot of light of constant size projected on the screen simulating a burst at a range of about 2,000 yards. The trace projector simulates the visual effect of tracer ammunition as a point in space when the rear trace burns out. The trace appears when the trigger is operated but lasts only momentarily. It is driven in elevation and its position is always a function of superelevation and ammunition number. The burst projector is driven from both azimuth and elevation. The elevation position is a function of the difference between the estimated superelevation and the true superelevation, or the superelevation error. The azimuth position is a function of the cant angle. For simplicity, the effect of the cant is simulated by tilting the projected picture in the opposite direction.

The instructor's console also contains the target data storage system, the scoring detectors and computers. The instructor's console contains a series of indicator lights representing before and after operation checks corresponding to the actual operations required to be performed in the tactical vehicle. This provides a means of evaluating the turret crew in the performance of these checks. Each time the trigger is depressed the rounds fire counter registers on the appropriate range-azimuth counters 150, 152, 154, 156, 158 and 160. Simultaneously, on-range and on-azimuth lamps register a hit. The scores received evaluate the proficiency of the crew.

The scoring tolerance in ranging and aiming (azimuth and elevation) is adjustable by means of switch settings on the face of the scoring panel. Credit is given for correct range based upon 1, 3, 7 and 15 units of error depending upon the range error setting used and for 0.5, 1.0 and 3.0 mils depending upon the aiming error setting. The aiming error scoring tolerance is always based upon a 3,000 yard target. The unit of error as a measure of error and ranges is based upon one unit of error being equivalent to 4.65 times the range in thousand yards squared.

Information for determining the aiming error is obtained from a target tracker. This target tracker contains a telescope and photoelectric scanning mechanism positioned in azimuth and elevation by restoring motors and is capable of locking on a projected target's spot. The tracker is mounted on top of the rangefinder and moves with the turret, fixing on a spot when it is released within range of a spot. The target tracker is designed with a fixed elevation offset to correspond with the exact angle of offset of the spot printed on the slide for each target. Azimuth offset angle is zero. When aiming is correct in both azimuth and elevation, the error signals generated by the target tracker are zero. Any error in aiming in either azimuth or elevation produces an error signal which is used to determine the accuracy of scoring. The scoring panel also contains an ammunition number dial which indicates the ammunition number set on the control knob in the rangefinder.

A target selector sequence indicator also provided on the scoring panel gives additional information on crew performance. This consists of a bank of 25 lights which indicate when the trainee is aiming within a 2½ degree angle (by the proper indicator lighting dimly); the priority of the target (A,B,C, D or E) when the 90 mm. gun has been fired at this target (by the same indicator lighting brightly), rounds fired at each target and the order of shots fired (1 through 5).

The trainer operates as an analog computer and ranging and tracking accuracies or aiming errors are represented as voltages and the direction of error is represented by the phase angle of the voltage. One mil is represented by the value of 0.46 volt. All the servo systems and phase detectors operate on a 60-cycle carrier system.

The azimuth, elevation and range data for 50 problems is contained on 800 carbon potentiometers located within the stored data chassis in the instructor's console. When the instructor switches to a particular problem number pertaining to a slide he automatically by operating a multiple 50 point stepping switch, selects a group of 16 of the 800 data potentiometers pertaining to the slide selected. This provides azimuth, elevation and range data for each of five targets and a cant for the entire problem. The next selection is done automatically by the azimuth and elevation data detectors.

These detectors compare azimuth and elevation position signals which are received from the turret with the stored coarse azimuth and elevation data of the five targets on the projected slide. The azimuth indicator has been modified by the insertion of two gears and a potentiometer to pick up turret position. A similar change has been made to pick up elevation from the rangefinder. When the turret and gun position signals are close to the stored data signals of any target on the slide, the stored true range data for that target is fed to the scoring system and other components.

All range data voltages vary as a reciprocal of range to permit the comparison with the rangefinder output which is also a reciprocal of range. The inputs to the computer are: (1) turret azimuth; (2) gun or rangefinder elevation (taken from the range compensator servo section of the rangefinder); (3) rangefinder estimated range as a reciprocal function; (4) superelevation angle as computed by the rangefinder; and (5) the ballistic ammunition setting of the rangefinder (taken from a potentiometer located in the rangefinder which takes the sum of the ammunition selector knob position and the ballistic correction knob position).

The rangefinder superelevation angle is fed through summing resistors to the burst elevation and tracer elevation servos. At the input to the tracer elevation servo, the rangefinder superelevation angle is summed with the ballistic correction and ammunition number signal and with the positive feedback signal from the tracer elevation servo drive. The rangefinder superelevation angle is also summed with the true superelevation signal and the position feedback signal from the burst elevation.

The range signal expressed as a reciprocal is fed to four units of the trainer as follows: (1) the rangefinder optical compensator true range servo; (2) the true superelevation computer true range servo; (3) the over-range phase detector; and (4) the under-range phase detector.

The true range signal is repeated by the feedback potentiometer on the superelevation true range servo and is fed to the aiming tolerance selector switch in two forms (phase A and phase B). This makes the aiming tolerance voltage a reciprocal function of range with large aiming tolerances at small ranges and small aiming tolerances at large ranges. Azimuth and elevation sighting error is obtained from the target tracker synchros which generate voltages proportional to the sighting error and of the proper phase. The sighting error voltages are fed through two azimuth and two elevation phase detectors and compared with the voltages representing the tolerances set in on the console. The true superelevation computer has two inputs—reciprocal of true range and ballistic correction ammunition number, the same as the trainer rangefinder. The computer operates on the same principle as the trainer rangefinder using a ballistic cam identical with that of the rangefinder. It computes true superelevation which is fed to the burst elevation servo system. It also computes the product of superelevation angle and cant angle. This product is fed to the burst azimuth servo through a summing resistor. The burst and tracer time are also computed here.

Obviously many modifications and variations of the present invention are possible in the light of the above teachings. It is therefore to be understood that within the scope of the appended claims the invention may be practiced otherwise than as specifically described.

What is claimed is:

1. A tank turret trainer comprising a simulated tank turret rotatably mounted on a supporting stand, a hemispherical screen operatively mounted in front of said tank turret, a terrain projector operative with said hemispherical screen for projection of wide-angle photographic slides of up to five real targets and backgrounds, separate projectors operable with said hemispherical screen for projection of tracer, burst and point of aim, means for controlling said projectors and said simulated tank turret, said control means being located within said tank turret in simulation of actual operating controls whereby targets, terrain, burst and tracer displays are projected on the screen and said controls within said simulated tank turret are operated by a trainee, actual hits, bursts and tracers being visible to the trainee in cooperation with simulated gun controls whereby an actual operational battle is simulated for training purposes, and means for determining whether the trainee has selected to aim at the target of highest strategic priority, operatively coupled to said control means.

2. A tank turret trainer comprising a simulated tank turret rotatably mounted on a supporting stand, a hemispherical screen operatively mounted in front of said tank turret, a terrain projection operative with said hemispherical screen for projection of wide-angle photographic slides of real targets and backgrounds, separate projectors operable with said hemispherical screen for projection of tracer, burst and point of aim, means for controlling said projector and said simulated tank turret, said control means being located within said tank turret in simulation of actual operating controls whereby targets, terrain, burst and tracer displays are projected on the screen and said projector controls within said simulated tank turret are operated by a trainee, actual hits, bursts, and tracers being visible to the trainee in cooperation with simulated gun controls whereby an actual operation battle is simulated for training purposes, and wherein said control means for said tank turret and projectors comprise rangefinder means operatively connected with said tank turret, motion detection means also operatively connected to said rangefinder means, and computer means operatively connected to said rangefinder means, gun motion and tank turret detection means, whereby said control means set the ballistics values for each individual problem, said computer means utilize the information supplied by the rangefinder means and the tank turret gun motion detection means for generation of signals for controlling the projecting means and the indicating means whereby the trainee's operation of control means is integrated with a sample problem means for generation of indications of hits or misses.

3. The device as in claim 2, which further includes means for presenting a plurality of battle problems, operatively coupled to said terrain projector, and indicating means operatively coupled to said control means for evaluating the trainee's performance for each of the battle problems presented.

References Cited by the Examiner

UNITED STATES PATENTS

| | | | |
|---|---|---|---|
| 2,406,574 | 8/46 | Waller et al. | 35—25 |
| 2,418,512 | 4/47 | Johnson | 35—25 |
| 2,662,305 | 12/53 | Alric | 35—25 |

FOREIGN PATENTS

| | | |
|---|---|---|
| 617,326 | 2/49 | Great Britain. |
| 1,091,460 | 10/60 | Germany. |

OTHER REFERENCES

Antiaircraft Journal, vol. 95, No. 4, page 18, July–August 1952.

JEROME SCHNALL, *Primary Examiner.*

LAWRENCE CHARLES, LEO SMILOW, *Examiners.*